United States Patent
Fan et al.

(10) Patent No.: US 10,116,388 B2
(45) Date of Patent: Oct. 30, 2018

(54) APPARATUS FOR MEASURING A FILTERING CHARACTERISTIC, PRE-EQUALIZER AND COMMUNICATION EQUIPMENT

(71) Applicant: FUJITSU LIMITED, Kawasaki (JP)

(72) Inventors: Yangyang Fan, Beijing (CN); Zhenning Tao, Beijing (CN); Liang Dou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/375,714

(22) Filed: Dec. 12, 2016

(65) Prior Publication Data

US 2017/0170902 A1    Jun. 15, 2017

(30) Foreign Application Priority Data

Dec. 11, 2015  (CN) .......................... 2015 1 0920650

(51) Int. Cl.
*H04B 10/25* (2013.01)
*H04B 10/2507* (2013.01)
*H04B 10/079* (2013.01)
*H04B 10/58* (2013.01)

(52) U.S. Cl.
CPC . *H04B 10/25073* (2013.01); *H04B 10/07955* (2013.01); *H04B 10/58* (2013.01)

(58) Field of Classification Search
CPC ........ H04B 10/25073; H04B 10/07955; H04B 10/58; H04B 17/21; H04B 17/318
See application file for complete search history.

(56) References Cited

U.S. PATENT DOCUMENTS

2003/0099286 A1* 5/2003 Graziano .............. H04L 1/0001
                                                                    375/222
2006/0072485 A1* 4/2006 Cairns ............... H04L 25/03006
                                                                    370/290

FOREIGN PATENT DOCUMENTS

| CN | 1711736 A | 12/2005 |
| CN | 1881908 A | 12/2006 |
| CN | 102025327 A | 4/2011 |
| CN | 102141608 A | 8/2011 |
| WO | WO 2010/048982 A1 | 5/2010 |

OTHER PUBLICATIONS

Lei Li et al., "Wide-range, Accurate and Simple Digital Frequency Offset Compensator for Optical Coherent Receivers", OFC2008 OWT4, Mar. 2008.

(Continued)

*Primary Examiner* — Kabir A Timory
(74) *Attorney, Agent, or Firm* — Staas & Halsey LLP

(57) ABSTRACT

A method and apparatus for measuring a filtering characteristic, pre-equalizer and communication equipment. The method includes: obtaining a receiving signal after two measurement signals of different spectral ranges pass through different filtering modules and are received at the same time at a receiving end; and determining a part of a filtering characteristic of a receiving end and a part of a joint response according to a nonoverlapped spectral part of the two signals in the spectrum of the receiving signal.

18 Claims, 17 Drawing Sheets

(56) References Cited

OTHER PUBLICATIONS

Danish Rafique et al., "Digital Pre-Emphasis in Optical Communication Systems: On the DAC Requirements for Terabit Transmission Applications", Journal of Lightwave Technology, vol. 32, No. 19, Oct. 1, 2014, p. 3247.

Antonio Napoli et al., "Novel DAC digital pre-emphasis algorithm for next-generation flexible optical transponders", OFC2015 Th3G.6.

Xiang Zhou et al., "64-Tb/s, 8 b/s/Hz, PDM-36QAM Transmission Over 320 km Using Both Pre- and Post-Transmission Digital Signal Processing", Journal of Lightwave Technology, vol. 29, No. 4, Feb. 15, 2011, p. 571.

Zhensheng Jia et al., "Performance Analysis of Pre- and Post-Compensation for Bandwidth-Constrained Signal in High-Spectral-Efficiency Optical Coherent Systems", OFC2014, W3K.3.

Juan Qi et al., "Generation of 28GBaud and 32GBaud PDM-Nyquist-QPSK by a DAC with 11.3GHz Analog Bandwidth", OFC2013, OTh1F.1.

\* cited by examiner

APPARATUS FOR MEASURING A FILTERING CHARACTERISTIC, PRE-EQUALIZER AND COMMUNICATION EQUIPMENT

CROSS-REFERENCE TO RELATED APPLICATIONS

This application claims the priority benefit of Chinese Patent Application No. 201510920650.2, filed on Dec. 11, 2015 in the Chinese Intellectual Property Office, the disclosure of which is incorporated herein in its entirety by reference.

BACKGROUND

1. Field

The present disclosure relates to the field of communications, and in particular to a method and apparatus for measuring a filtering characteristic, pre-equalizer and communication equipment.

2. Description of the Related Art

As the requirements of an optical communication system on low cost, miniature and flexible configuration, optical and electrical bandwidths of a transmitter of the optical communication system are reduced for various reasons. Currently, a problem of narrow bandwidth may be overcome by using pre-equalization, pre-distortion and pre-emphasis technologies in a digital domain.

FIG. 1 is a schematic diagram of a transmitter in the related art using the digital pre-equalization technology. As shown in FIG. 1, the transmitter 100 includes an emitter 101, a pre-equalizer 102, a digital-to-analog converting module 103, a laser 104 and an optical modulator 105, the optical modulator 105 including a pluggable interface, and an electrical driving amplifier, etc.; wherein, the emitter 101 emits digital electrical signals, the pre-equalizer 102 pre-compensates for a filtering damage to the emitted digital electrical signals brought about by subsequent filtering modules of the transmitter 100, such as the digital-to-analog converting module 103 and the optical modulator 105, the compensated digital electrical signals are converted into analog signals after passing through the digital-to-analog converting module 103, and optical signals are outputted after the analog signals are modulated by the optical modulator 105. Here, the filtering damage brought about by the subsequent modules after the pre-equalizer 102 in the transmitter is referred to as a filtering characteristic of a transmitting end.

FIG. 2 is a schematic diagram of a receiver in the related art. As shown in FIG. 2, the receiver 200 includes an optical coherent demodulator 201, a local laser 202, an analog-to digital converting module 203 and a receiving device 204, the optical coherent demodulator consisting of an optical mixer (having no filtering damage) and an optical-to-electrical converter (having filtering damages); wherein, optical signals outputted from the transmitter 100 are demodulated into analog electrical signals by the optical coherent demodulator 201, the analog electrical signals are converted into digital electrical signals by the analog-to digital converting module 203, and the digital electrical signals are received by the receiving device 204. And, a filtering damage exists in the optical signals outputted from the transmitter 100 after passing through the filtering modules of the receiver 200, such as the optical coherent demodulator 201 and the analog-to digital converting module 203. Here, the filtering damage is referred to as a filtering characteristic of a receiving end.

Currently, a common frequency domain or time domain method may be used for pre-equalization, and a coefficient of a pre-equalizer may be obtained by using many methods in the related art, such as zero forcing, and minimum mean square error, etc.; however, a filtering characteristic of a transmitting end needs to be known to these methods.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the invention.

At present, instruments are often used to measure a filtering characteristic of a transmitting end or a receiving end, which is high in cost, and is hard in large-scale use.

Embodiments of the present disclosure provide a method and apparatus for measuring a filtering characteristic, pre-equalizer and communication equipment, in which measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

The above aim of the embodiments of the present disclosure is achieved by the following technical solutions.

According to a first aspect of the embodiments of the present disclosure, there is provided an apparatus for measuring a filtering characteristic, including:

a first determining unit configured to determine a first part of a filtering characteristic of a receiving end, or determine a first part of a joint response of a filtering characteristic of a transmitting end and a filtering characteristic of the receiving end, in a spectrum of a first receiving signal obtained after a first measurement signal and a second measurement signal pass through respective filtering modules, according to a nonoverlapped spectral part of the first measurement signal and the second measurement signal;

a second determining unit configured to determine a second part of the filtering characteristic of the receiving end in a spectrum of a second receiving signal obtained after a third measurement signal and the second measurement signal pass through respective filtering modules, according to a nonoverlapped spectral part of the third measurement signal and the second measurement signal, or determine a second part of the joint response of the filtering characteristic of the transmitting end and the filtering characteristic of the receiving end, in a spectrum of a second receiving signal obtained after a fourth measurement signal and the first measurement signal pass through respective filtering modules, according to a nonoverlapped spectral part of the fourth measurement signal and the first measurement signal; and a first processing unit configured to determine the filtering characteristic of the receiving end according to the first part of the filtering characteristic and the second part of the filtering characteristic, or determine the joint response of the filtering characteristic of the receiving end and the filtering characteristic of the transmitting end according to the first part of the joint response and the second part of the joint response;

wherein, the filtering modules through which the first measurement signal and the third measurement signal pass include a transmitting end filtering module and a receiving end filtering module, the filtering module through which the second measurement signal and the fourth measurement signal pass include the transmitting end filtering module, spectral ranges of the first measurement signal and the second measurement signal are different, and frequencies of the third measurement signal and the first measurement signal are complementary, or frequencies of the fourth measurement signal and the second measurement signal are complementary;

and the frequency complimentary denotes that spectral ranges of two measurement signals cover all measurement range of the filtering characteristic, and the two measurement signals have an overlapped frequency point; and the first measurement signal, the second measurement signal, the third measurement signal and the fourth measurement signal are continuous signals.

According to a second aspect of the embodiments of the present disclosure, there is provided an apparatus for measuring a filtering characteristic, including:

a fourth processing unit configured to determine a filtering characteristic of a receiving end according to a power spectral density of a third receiving signal obtained after a second measurement signal passes through a receiving end filtering module.

According to a third aspect of the embodiments of the present disclosure, there is provided a pre-equalizer, including:

a characteristic measuring unit configured to determine a filtering characteristic of a receiving end or a joint response of a filtering characteristic of a transmitting end and a filtering characteristic of a receiving end, and determine a filtering characteristic of a transmitting end according to the filtering characteristic of the receiving end and the joint response, which including the apparatus for measuring a filtering characteristic as described in the first aspect and second aspect; and a pre-equalizing unit configured to determine a coefficient of the pre-equalizer according to the filtering characteristic of the transmitting end, and perform pre-equalization on a transmission signal by using the coefficient of the pre-equalizer.

According to a fourth aspect of the embodiments of the present disclosure, there is provided communication equipment, including the apparatus for measuring a filtering characteristic as described in the first or the second aspect.

An advantage of the embodiments of the present disclosure exists in that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION

Figure 1:
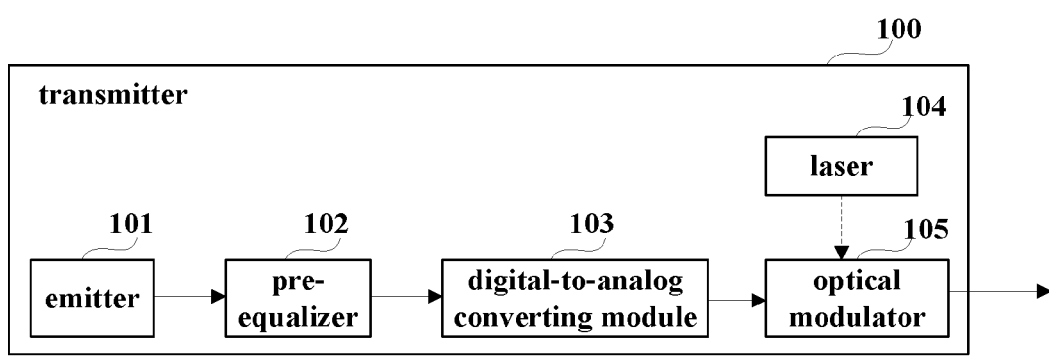
FIG. 1 is a schematic diagram of an optical transmitter in the related art using the digital pre-equalization technology.

Reference will now be made in detail to the embodiments, examples of which are illustrated in the accompanying drawings, wherein like reference numerals refer to the like elements throughout. The embodiments are described below to explain the present invention by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of the present disclosure shall be described below with reference to the accompanying drawings.

In these embodiments, a filtering characteristic of a transmitting end refers to a filtering damage brought about by a filtering module of a transmitter or a filtering module of a transmitting end of a transceiver, which is denoted by G(f); and a filtering characteristic of a receiving end refers to a filtering damage brought about by a filtering module of a receiver or a filtering module of a receiving end of a transceiver, which is denoted by H(f).

In these embodiments, a joint response of a filtering characteristic of a transmitting end and a filtering characteristic of a receiving end refers to a joint filtering damage brought about by the filtering modules of the transmitter and the receiver, or a joint filtering damage brought about by the filtering modules of the transmitting end and the receiving end of the transceiver, which is denoted by G(f)H(f).

In these embodiments, the filtering characteristics G(f), H(f) and G(f)H(f) include amplitude frequency characteristics (shapes of the filtering characteristics) of the filtering modules; wherein, the corresponding amplitude frequency characteristics are denoted by |G(f)|, |H(f)| and |G(f)H(f)|.

In the known art, instruments are often used to measure the filtering characteristic of the transmitting end or the receiving end, which is high in cost, and is hard in large-scale use. It was found by the inventors in the implementation of the present disclosure that nonoverlapped spectra of two measurement signals passing though different filtering modules may be used to perform two times of measurement, so as to determine the filtering characteristic H(f) of the receiving end or the joint response G(f)H(f), and furthermore, to determine the filtering characteristic G(f) of the transmitting end, with a spectral range of one of the measurement signals covers all measurement range of the filtering characteristic, and frequencies of the other measurement signal at the two times of measurement are complementary; wherein, frequency complementarity indicates that the spectral ranges of the two measurement signals cover all the measurement ranges of the filtering characteristic, and the two measurement signals have an overlapped frequency point. For example, if a spectral range of one measurement signal is $[0, f_1]$, and a spectral range of the other measurement signal is $$\left[f_1, \frac{f_s}{2}\right], \left[0, \frac{f_s}{2}\right]$$

covers all measurement range of the filtering characteristic, the frequencies of the two measurement signals are complementary (wherein, $f_1$, $$\frac{f_s}{2}$$

may be set to be any value as demanded), and all measurement signals are continuous signals.

Following description shall be given taking that a spectral range of a first measurement signal passing through a transmitting end filtering module and a receiving end filtering module covers all measurement range of a filtering characteristic, and frequencies of a second measurement signal and a fourth measurement signal passing through a receiving end filtering module are complementary, or a spectral range of a second measurement signal passing through a receiving end filtering module covers all measurement range of a filtering characteristic, and frequencies of a first measurement signal and a third measurement signal passing through a transmitting end filtering module and a receiving end filtering module are complementary, as examples, respectively.

Preferred embodiments of the present disclosure shall be described below with reference to the accompanying drawings.

Embodiment 1

Embodiment 1 of the present disclosure provides a method for measuring a filtering characteristic. In this embodiment, a spectral range of a second measurement signal covers all measurement range of a filtering characteristic, and frequencies of a first measurement signal and a third measurement signal are complementary.

Figure 3:
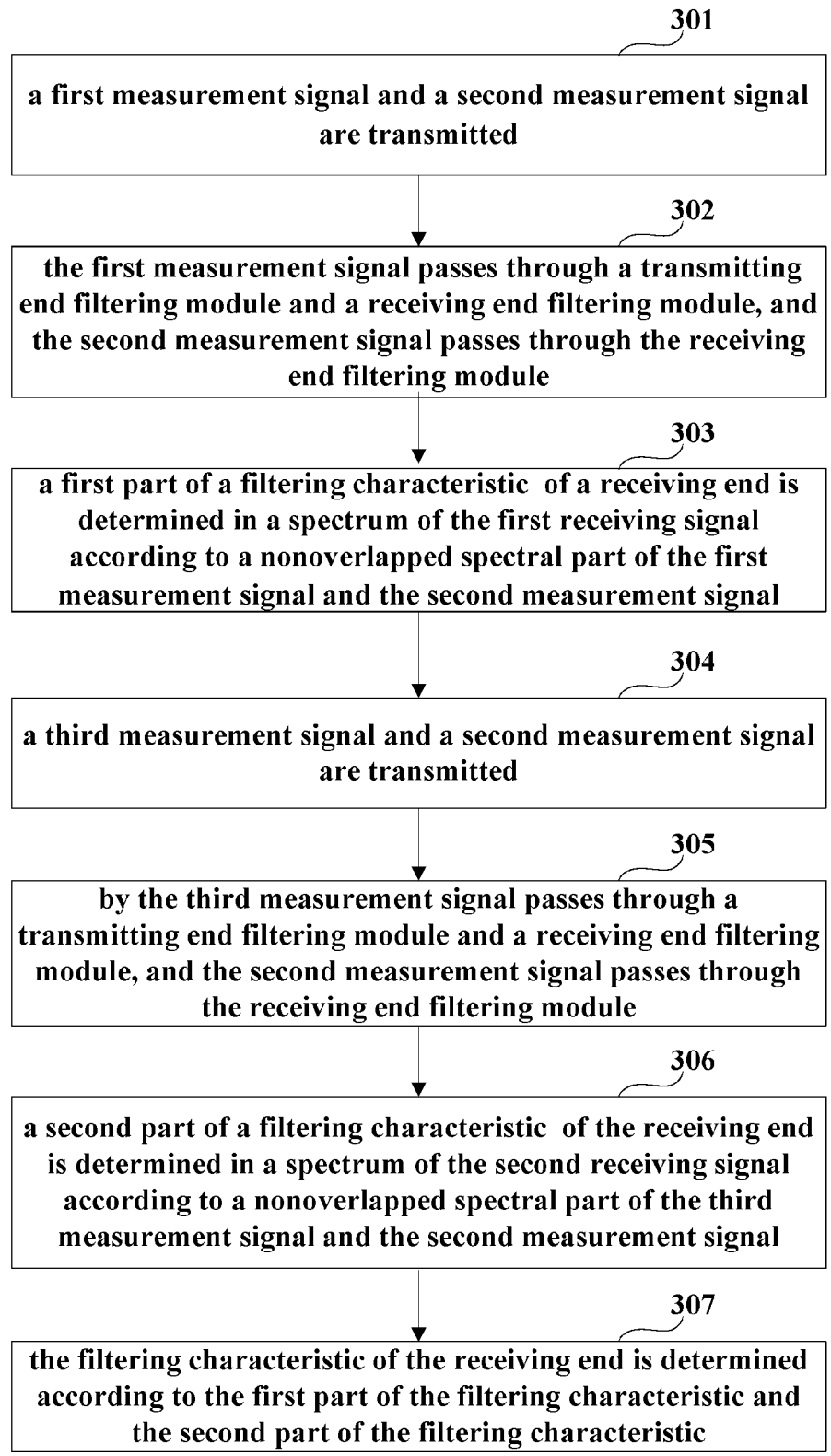
FIG. 3 is a flowchart of a method for measuring a filtering characteristic of Embodiment 1.

FIG. 3 is a flowchart of the method for measuring a filtering characteristic of Embodiment 1 of the present disclosure. Referring to FIG. 3, the method includes:

step 301: a first measurement signal and a second measurement signal are transmitted;

in this embodiment, spectral ranges of the first measurement signal and the second measurement signal are different, and the first measurement signal and the second measurement signal are continuous signals. For example, the continuous signals may be Gaussian white noises having flat power spectral densities (such as amplified spontaneous emission (ASE) noises generated by an erbium-doped fiber amplifier). However, the continuous signals are not limited to the above signals, and may be any signals of known spectral shapes, such as Nyquist pulse signals, etc.;

step 302: the first measurement signal passes through a transmitting end filtering module and a receiving end filtering module, and the second measurement signal passes through the receiving end filtering module;

in this embodiment, after the first measurement signal passes through the transmitting end filtering module, the second measurement signal is overlapped with the first measurement signal for transmission; a signal obtained after the first measurement signal and the second measurement signal passing through identical receiving end filtering module is referred to as a first receiving signal, and if the first measurement signal and the second measurement signal are denoted by $S_1(f)$ and $S_2(f)$ respectively, and the first receiving signal is denoted by $R_1(f)$, the receiving signal is $R_1(f)=S_1(f)G(f)H(f)+S_2(f)H(f)$;

step 303: a first part of a filtering characteristic $H_1(f)$ of a receiving end is determined in a spectrum of the first receiving signal according to a nonoverlapped spectral part of the first measurement signal and the second measurement signal;

in this embodiment, as the spectral ranges of the first measurement signal and the second measurement signal are different, overlapped first measurement signal and second measurement signal are easy to be separated; hence, the nonoverlapped spectra of the first measurement signal and the second measurement signal may be used to determine $H_1(f)$, and the nonoverlapped spectral part is a response of $S_2(f) H(f)$ of the nonoverlapped spectra of the first measurement signal and the second measurement signal;

step 304: a third measurement signal and a second measurement signal are transmitting;

in this embodiment, spectral ranges of the third measurement signal and the second measurement signal are different, frequencies of the third measurement signal and the first measurement signal are complementary, and the third measurement signal and the first measurement signal are continuous signals;

step 305: the third measurement signal passes through a transmitting end filtering module and a receiving end filtering module, and the second measurement signal passes through the receiving end filtering module;

in this embodiment, after the third measurement signal passes through the transmitting end filtering module, the second measurement signal is overlapped with the third measurement signal for transmission; a signal obtained after the third measurement signal and the second measurement signal passing through identical receiving end filtering module is referred to as a second receiving signal, and if the third measurement signal and the second measurement signal are denoted by $S_3(f)$ and $S_2(f)$ respectively, and the second receiving signal is denoted by $R_2(f)$, the receiving signal is $R_2(f)=S_3(f)G(f)H(f)+S_2(f)H(f)$;

step 306: a second part of a filtering characteristic $H_2(f)$ of the receiving end is determined in a spectrum of the second receiving signal according to a nonoverlapped spectral part of the third measurement signal and the second measurement signal;

in this embodiment, as the spectral ranges of the third measurement signal and the second measurement signal are different, overlapped third measurement signal and second measurement signal are easy to be separated; hence, the nonoverlapped spectra of the third measurement signal and the second measurement signal may be used to determine $H_2(f)$, and the nonoverlapped spectral part is a response of $S_2(f) H(f)$ of the nonoverlapped spectra of the third measurement signal and the second measurement signal;

step 307: the filtering characteristic of the receiving end is determined according to the first part of the filtering characteristic and the second part of the filtering characteristic.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

In this embodiment, in steps 301 and 304, an emitter of a transmitter or a transceiver may be used to transmit the first measurement signal, the second measurement signal and the third measurement signal; in steps 302 and 305, the transmitting end filtering module is a transmitting end filtering module of a transmitter or a transceiver of which a transmitting end filtering characteristic is to be measured, and the receiving end filtering module is a receiving end filtering module of a receiver or a transceiver of which a receiving end filtering characteristic is to be measured. Taking the transmitter shown in FIG. 1 as an example, when the receiving end filtering characteristic is measured, the pre-equalizer 102 of the transmitter 100 is disabled, and the emitter 101 transmits the first measurement signal and the third measurement signal to the digital-to-analog converting module 103, and transmits the second measurement signal to the optical coherent demodulator 201, respectively.

In this embodiment, in steps 301 and 304, when the first measurement signal, the third measurement signal and the second measurement signal are transmitted, the original emitter of the transmitter or the transceiver is reused, and a specifically provided emitter may also be used to transmit the above first measurement signal, the third measurement signal or the second measurement signal. Then the first measurement signal and the third measurement signal are made to pass through the transmitting end filtering module and the receiving end filtering module, without passing through the pre-equalizer, and the second measurement signal is made to pass through the receiving end filtering module.

In this embodiment, the part of the filtering characteristic of the receiving end may be obtained in steps 303 and 306 in the following manner. For example, the spectral range of the first measurement signal is [0, f₁], the spectral range of the third measurement signal is $$\left[f_1, \frac{f_s}{2}\right],$$

and the spectral range of the second measurement signal is $$\left[0, \frac{f_s}{2}\right].$$

However, this embodiment is not limited thereto. For example, the spectral ranges of the first measurement signal and the third measurement signal are interchangeable.

In the first time of measurement in step 303, the power spectral density of the first receiving signal is calculated, and a first power spectral density of the nonoverlapped spectral part of the first measurement signal and second measurement signal is extracted from the spectrum of the power spectral density of the first receiving signal, so as to obtain the first part of the filtering characteristic of the receiving end.

In this embodiment, as the spectral range of the first measurement signal covers only a part of all measurement range and the spectral range of the second measurement signal covers all measurement range, the nonoverlapped spectral part of the first measurement signal and second measurement signal corresponds to the spectrum of the second measurement signal with the spectral part of the first measurement signal being removed. As the second measurement signal only passes through the receiving end filtering module, the extracted first power spectral density is $$N|H(f)|^2 \left(f \in \left[f_1, \frac{f_s}{2}\right]\right);$$

where, N is a value of the power spectral density of the second measurement signal. And as relative responses of the frequency points are important, when the second measurement signal has a flat power spectral density (power spectral densities of frequency components are identical or amplitude frequency responses of the frequency components are identical), N needs not to be learnt, and the first part of the filtering characteristic of the receiving end may be calculated by extracting a root of the first power spectral density N|H(f)|²; or as N is a known value, the root of the first power spectral density N|H(f)|² is extracted after N is removed therefrom, so as to obtain the first part of the filtering characteristic (amplitude frequency characteristic)

$$|H(f)|, \left(f \in \left[f_1, \frac{f_s}{2}\right]\right)$$

of the receiving end.

In the second time of measurement in step 306, the power spectral density of the second receiving signal is calculated, and a second power spectral density of the nonoverlapped spectral part of the third measurement signal and second measurement signal is extracted from the spectrum of the power spectral density of the second receiving signal, so as to obtain the second part of the filtering characteristic of the receiving end.

In this embodiment, as the spectral range of the third measurement signal covers only another part of all measurement range and the spectral range of the second measurement signal covers all measurement range, the nonoverlapped spectral part of the third measurement signal and second measurement signal corresponds to the spectrum of the second measurement signal with the spectral part of the third measurement signal being removed. As the second measurement signal only passes through the receiving end filtering module, the extracted second power spectral density is N|H(f)|²(f∈[0, f₁]). And the second part of the filtering characteristic (amplitude frequency characteristic) |H(f)|, (f∈[0, f₁]) of the receiving end is obtained according to the second power spectral density, with a particular implementation being identical to that of obtaining the first part of filtering characteristic, and being not going to be described herein any further.

In step 307, the filtering characteristic of the receiving end is determined according to the first part of filtering characteristic and the second part of filtering characteristic.

For example, the first power spectral density and the second power spectral density are integrated, so as to obtain |H(f)| of the receiving end in the whole measurement range.

In an implementation, when the responses of the first part of the filtering characteristic and the second part of the filtering characteristic are identical at the overlapped frequency point, the first part of the filtering characteristic and the second part of the filtering characteristic are combined directly, so as to obtain the consecutive filtering characteristic.

In another implementation, when the responses of the first part of the filtering characteristic and the second part of the filtering characteristic are different at the overlapped frequency point, the responses of the first part of the filtering characteristic and the second part of the filtering characteristic at the overlapped frequency point are adjusted to be identical, and the adjusted first part of filtering characteristic and second part of filtering characteristic are combined, so as to obtain the consecutive filtering characteristic.

In this embodiment, alternatively, the method may further include: determining a joint response of the filtering characteristic of the receiving end and the filtering characteristic of the transmitting end.

Figure 4:
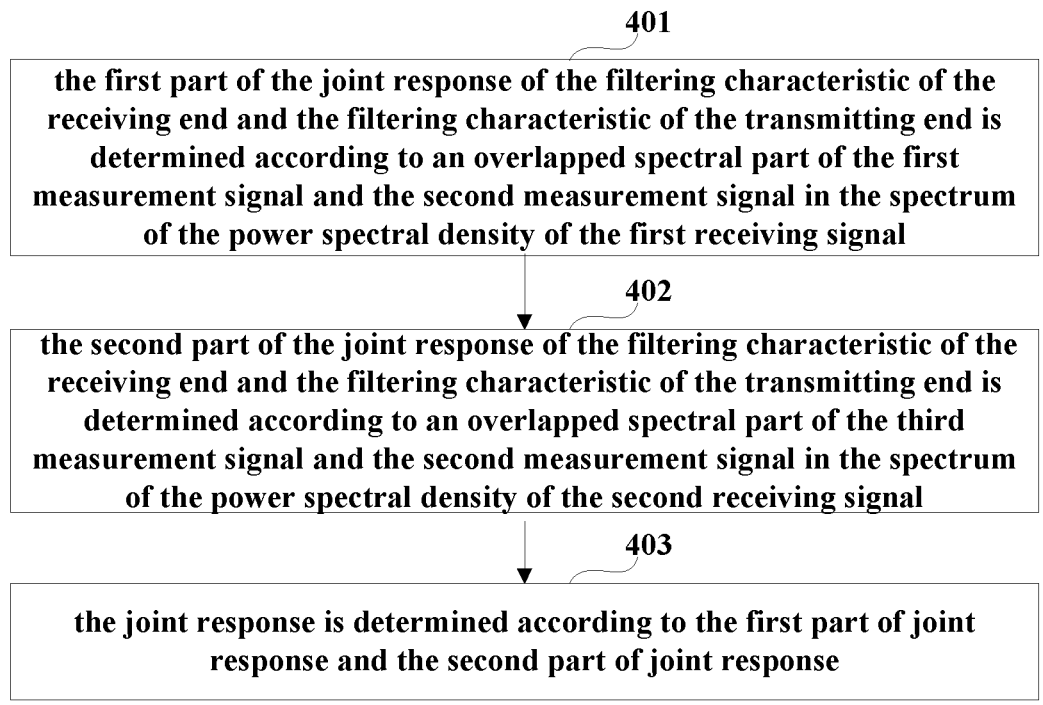
FIG. 4 is a flowchart of a method for determining a joint response of Embodiment 1.

FIG. 4 is a flowchart of a method for determining a joint response of this embodiment. As shown in FIG. 4, the method includes:

step 401: the first part of the joint response of the filtering characteristic of the receiving end and the filtering characteristic of the transmitting end is determined according to an overlapped spectral part of the first measurement signal and the second measurement signal in the spectrum of the power spectral density of the first receiving signal;

step 402: the second part of the joint response of the filtering characteristic of the receiving end and the filtering characteristic of the transmitting end is determined according to an overlapped spectral part of the third measurement signal and the second measurement signal in the spectrum of the power spectral density of the second receiving signal; and step 403: the joint response is determined according to the first part of joint response and the second part of joint response.

In the first time of measurement in step 401, as the spectral range of the first measurement signal covers only a part of all measurement range and the spectral range of the second measurement signal covers all measurement range, the overlapped spectral part of the first measurement signal and second measurement signal corresponds to the spectrum of the first measurement signal. As the first measurement signal passes through the transmitting end filtering module and the receiving end filtering module, a third power spectral density of the overlapped spectral part of the first measurement signal and second measurement signal extracted from the spectrum of the power spectral density of the first receiving signal is $A|G(f)H(f)|^2 (f \in [0, f_1])$; where, A is a value of the power spectral density of the first measurement signal. And as the relative responses of the frequency points are important, when the first measurement signal has a flat power spectral density, A needs not to be learnt, and the first part of the joint response may be calculated by extracting a root of the third power spectral density; or as A is a known value, the root of the third power spectral density is extracted after A is removed therefrom, so as to obtain the first part of the joint response (amplitude frequency characteristic) $|G(f)H(f)| (f \in [0, f_1])$.

In the second time of measurement in step 402, as the spectral range of the third measurement signal covers only another part of all measurement range and the spectral range of the second measurement signal covers all measurement range, the overlapped spectral part of the third measurement signal and second measurement signal corresponds to the spectrum of the third measurement signal. As the third measurement signal passes through the transmitting end filtering module and the receiving end filtering module, a fourth power spectral density of the overlapped spectral part of the third measurement signal and second measurement signal extracted from the spectrum of the power spectral density of the second receiving signal is $$B|G(f)H(f)|^2 \left( f \in \left[ f_1, \frac{f_s}{2} \right] \right);$$

where, B is a value of the power spectral density of the third measurement signal. And as the relative responses of the frequency points are important, when the third measurement signal has a flat power spectral density, B needs not to be learnt, and the second part of the joint response may be calculated by extracting a root of the fourth power spectral density; or as B is a known value, the root of the fourth power spectral density is extracted after B is removed therefrom, so as to obtain the second part of the joint response (amplitude frequency characteristic)

$$|G(f)H(f)| \left( f \in \left[ f_1, \frac{f_s}{2} \right] \right).$$

In step 403, the third power spectral density and the fourth power spectral density may be integrated, so as to obtain a joint response $|G(f)H(f)|$ in the whole measurement range.

In an implementation, when the responses of the first part of the joint response and the second part of the joint response are identical at the overlapped frequency point, the first part of joint response and the second part of joint response are combined directly, so as to obtain the consecutive joint response.

In another implementation, when the responses of the first part of the joint response and the second part of the joint response are different at the overlapped frequency point, the responses of the first part of the joint response and the second part of the joint response at the overlapped frequency point are adjusted to be identical, and the adjusted first part of joint response and second part of joint response are combined, so as to obtain the consecutive joint response.

In this embodiment, the spectra of the first measurement signal, the second measurement signal and the third measurement signal may be set to be of any shapes, but should not be zero in the spectral range needing to be measured. And when the first measurement signal, the second measurement signal and the third measurement signal have no flat power spectral densities, in steps 303 and 306, the power spectral density of the second measurement signal needs to be removed from the first power spectral density and the second power spectral density, so as to obtain the first part of the filtering characteristic and the second part of the filtering characteristic, in step 401, the power spectral density A of the first measurement signal needs to be removed from the third power spectral density, so as to determine the first part of the joint response, and in step 402, the power spectral density B of the third measurement signal needs to be removed from the fourth power spectral density, so as to determine the second part of the joint response.

In this embodiment, in order to improve accuracy of the measurement, in measuring the respective filtering characteristics of the transmitter, the receiver or the transceiver, in an implementation, a transmitter laser and a local laser are set to be having identical frequencies. And in another implementation, if there exists a frequency offset $\Delta f$ between the transmitter laser and the local laser, the frequency offset $\Delta f$ may be estimated according to the related art (such as Lei Li, "Wide-range, Accurate and Simple Digital Frequency Offset Compensator for Optical Coherent Receivers", OFC2008 OWT4), and influence of $\Delta f$ is removed, and furthermore, phase noises of the lasers may also be removed.

In this embodiment, when the second measurement signal is an ASE noise, in order to improve accuracy of the measurement, the first receiving signal may be divided into M blocks; wherein, temporally consecutive sample values are in each block, a length of each block is an integral multiple of a length of a period of the first measurement signal, and signals between the blocks are added up and averaged, so as to suppress interference of the ASE noise.

In this embodiment, the transmitting end filtering characteristic may be determined after the receiving end filtering characteristic and the joint response are determined.

In this embodiment, the joint response is divided by the receiving end filtering characteristic, so as to obtain the transmitting end filtering characteristic.

How to determine the receiving end filtering characteristic, the transmitting end filtering characteristic and the joint response shall be described below with reference to particular embodiments and the accompanying drawings.

Figure 5:
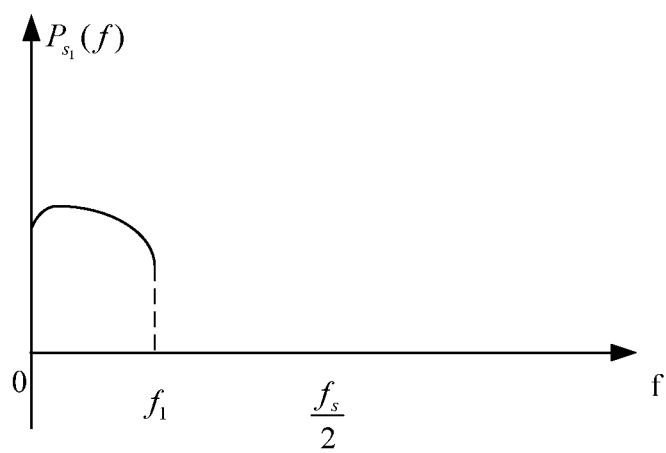
FIG. 5 is a schematic diagram of a power spectral density of a first measurement signal of Embodiment 1.
Figure 6:
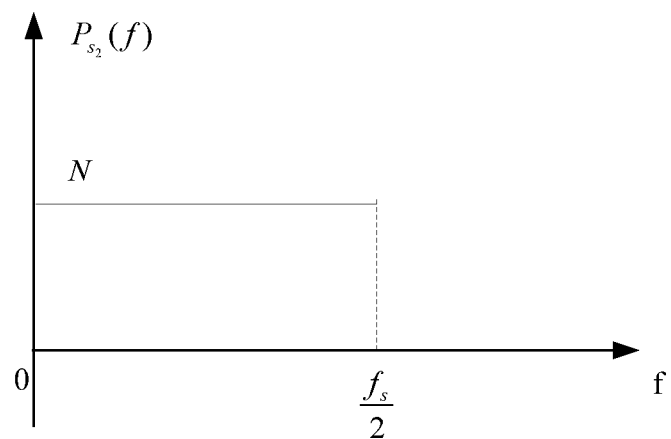
FIG. 6 is a schematic diagram of a power spectral density of a second measurement signal of Embodiment 1.
Figure 7:
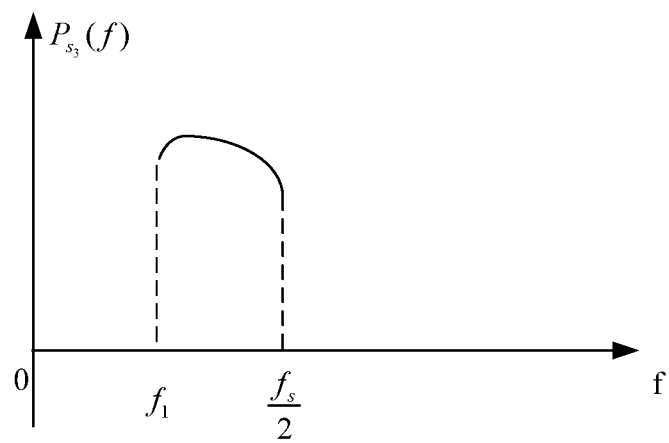
FIG. 7 is a schematic diagram of a power spectral density of a third measurement signal of Embodiment 1.
Figure 8:
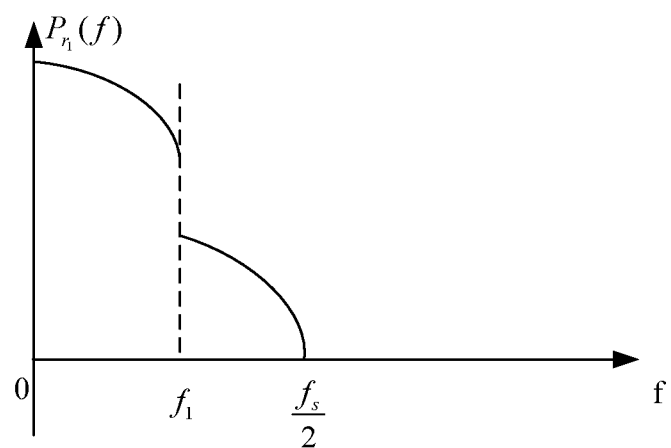
FIG. 8 is a schematic diagram of a power spectral density of a first receiving signal of Embodiment 1.
Figure 9:
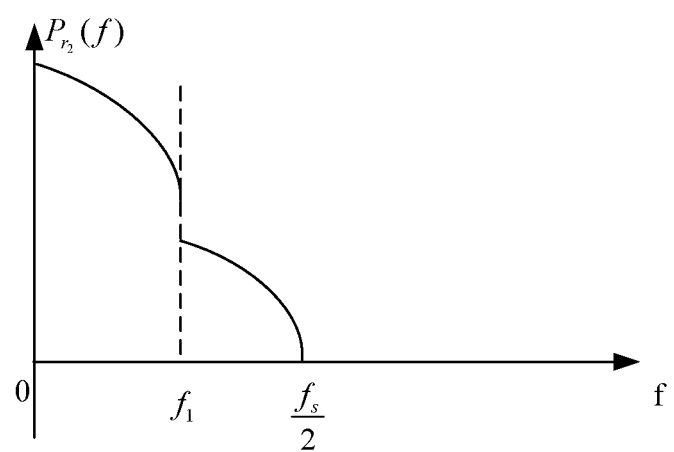
FIG. 9 is a schematic diagram of a power spectral density of a second receiving signal of Embodiment 1.

In this embodiment, FIG. 5 is a schematic diagram of the power spectral density of the first measurement signal, FIG. 6 is a schematic diagram of the power spectral density of the second measurement signal, FIG. 7 is a schematic diagram of the power spectral density of the third measurement signal of Embodiment 1, FIG. 8 is a schematic diagram of the power spectral density of the first receiving signal, and FIG. 9 is a schematic diagram of the power spectral density of the second receiving signal.

As shown in FIGS. 5, 6 and 8, the first measurement signal is a Nyquist pulse signal having a flat spectrum, and a spectral range of its power spectrum is $[0, f_1]$; the second measurement signal is an amplified spontaneous emission (ASE) noise, and a spectral range of its power spectrum is $$\left[0, \frac{f_s}{2}\right];$$

and the first receiving signal is obtained after the first measurement signal and the second measurement signal pass through the respective filtering modules.

In the first time of measurement, the power spectral density of the first receiving signal is calculated, and a power spectral density $P_{s_1(f)}|G(f)H(f+\Delta f)|^2$ in the spectral range of the first measurement signal (the overlapped spectral part of the first measurement signal and the second measurement signal) is extracted, so as to obtain the first part of the joint response; wherein, in order to improve accuracy of the measurement, the frequency offset $\Delta f$ between the local laser and the transmitter laser may be set to be 0, or the frequency offset $\Delta f$ between the local laser and the transmitter laser may be estimated and removed first, and the phase noises of the lasers are removed; furthermore, the first receiving signal is processed, so as to suppress the interference of the ASE noise, with a particular manner of processing being as that described above, and being not going to be described herein any further; the power spectral density of the processed first receiving signal is calculated, and is used to determine the first part of the joint response; and when the first measurement signal has no flat power spectral density, a root of $P_{s_1(f)}|G(f)H(f+\Delta f)|^2$ is extracted after $P_{s_1(f)}$ is removed therefrom, so as to obtain the first part of the joint response $|G(f)H(f+\Delta f)|$; furthermore, a power spectral density in $$\left[f_1, \frac{f_s}{2}\right]$$

except for the spectral range of the first measurement signal is extracted, which may be expressed as $$N|H(f)|^2 \left(f \in \left[f_1, \frac{f_s}{2}\right]\right),$$

for it contains only an ASE noise passing through the receiving end; and as N is a constant, the first part of filtering characteristic or shape $|H(f)|$ of the receiving end is obtained, that is, in the first time of measurement, $|G(f)H(f+\Delta f)|(f \in [0, f_1])$ and $$|H(f)|\left(f \in \left[f_1, \frac{f_s}{2}\right]\right)$$

are obtained.

As shown in FIGS. 6, 7 and 9, the third measurement signal is a Nyquist pulse signal having a flat spectrum, and a spectral range of its power spectrum is $$\left[f_1, \frac{f_s}{2}\right];$$

the spectral shape of the third measurement signal may be identical to or different from that of the first measurement signal, and a size of power spectral density of the second measurement signal in FIG. 6 may be varied or constant; and the second receiving signal is obtained after the third measurement signal and the second measurement signal pass through the respective filtering modules.

Similar to the first time of measurement, in the second time of measurement, the power spectral density of the second receiving signal is calculated, and a power spectral density $P_{s_1(f)}|G(f)H(f+\Delta f)|^2$ in the spectral range of the third measurement signal (the overlapped spectral part of the third measurement signal and the second measurement signal) is extracted, so as to obtain the second part of the joint response; wherein, in order to improve accuracy of the measurement, the frequency offset $\Delta f$ between the local laser and the transmitter laser may be set to be 0, or the frequency offset $\Delta f$ between the local laser and the transmitter laser may be estimated and removed first, and the phase noises of the lasers are removed; furthermore, the second receiving signal is processed, so as to suppress the interference of the ASE noise, with a particular manner of processing being as that described above, and being not going to be described herein any further; the power spectral density of the processed second receiving signal is calculated, and is used to determine the second part of the joint response; furthermore, a power spectral density in $[0, f_1]$ except for the spectral range of the third measurement signal is extracted, which may be expressed as $N|H(f)|^2 (f \in [0, f_1])$, for it contains only an ASE noise passing through the receiving end; and as N is a known, the second part of the filtering characteristic $|H(f)|$ of the receiving end is obtained, that is, in the second time of measurement, $$|G(f)H(f+\Delta f)|\left(f \in \left[f_1, \frac{f_s}{2}\right]\right)$$

and $|H(f)|(f \in [0, f_1])$ are obtained.

When results of the two times measurement are combined, for the same filtering characteristic, if responses of the two parts at a boundary $f_1$ are identical, the results may be combined directly, otherwise, the responses of the two parts at the boundary $f_1$ need to be adjusted to be identical, so as to obtain consecutive response values in the whole frequency measurement range. A method for adjusting response values at the boundary $f_1$ shall be described below by way of an example.

For the first part of response $C_1(f)$ ($f \in [0, f_1]$) and the second part of response $$C_2(f)\left(f \in \left[f_1, \frac{f_s}{2}\right]\right),$$

in which $C_1(f)$ and $C_2(f)$ may be parts of the filtering characteristic or parts of the joint response, a proportion factor $$k = \frac{C_1(f_1)}{C_2(f_1)}$$

is calculated, and a combined consecutive response is $$C(f) = C_1(f) + kC_2(f)\left(f \in \left[0, \frac{f_s}{2}\right]\right).$$

Furthermore, as $\Delta f$ and $|H(f)|$ are known, $|G(f)H(f+\Delta f)|$ is divided by $|H(f+\Delta f)|$, so as to obtain the transmitting end filtering characteristic $|G(f)|$.

In this embodiment, alternatively, when the emitters and filtering modules of the transmitter, the receiver or the transceiver are used in steps 301 and 302 and steps 304 and 305, the method may further include: setting the pre-equalizer of the transmitter or the transceiver, so as to disable the pre-equalizer.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

Embodiment 2

Embodiment 2 of the present disclosure provides a method for measuring a filtering characteristic. In this embodiment, what differs from Embodiment 1 is that the spectral range of the first measurement signal covers whole measurement range of a filtering characteristic, and frequencies of the second measurement signal and the fourth measurement signal are complementary.

Figure 10:
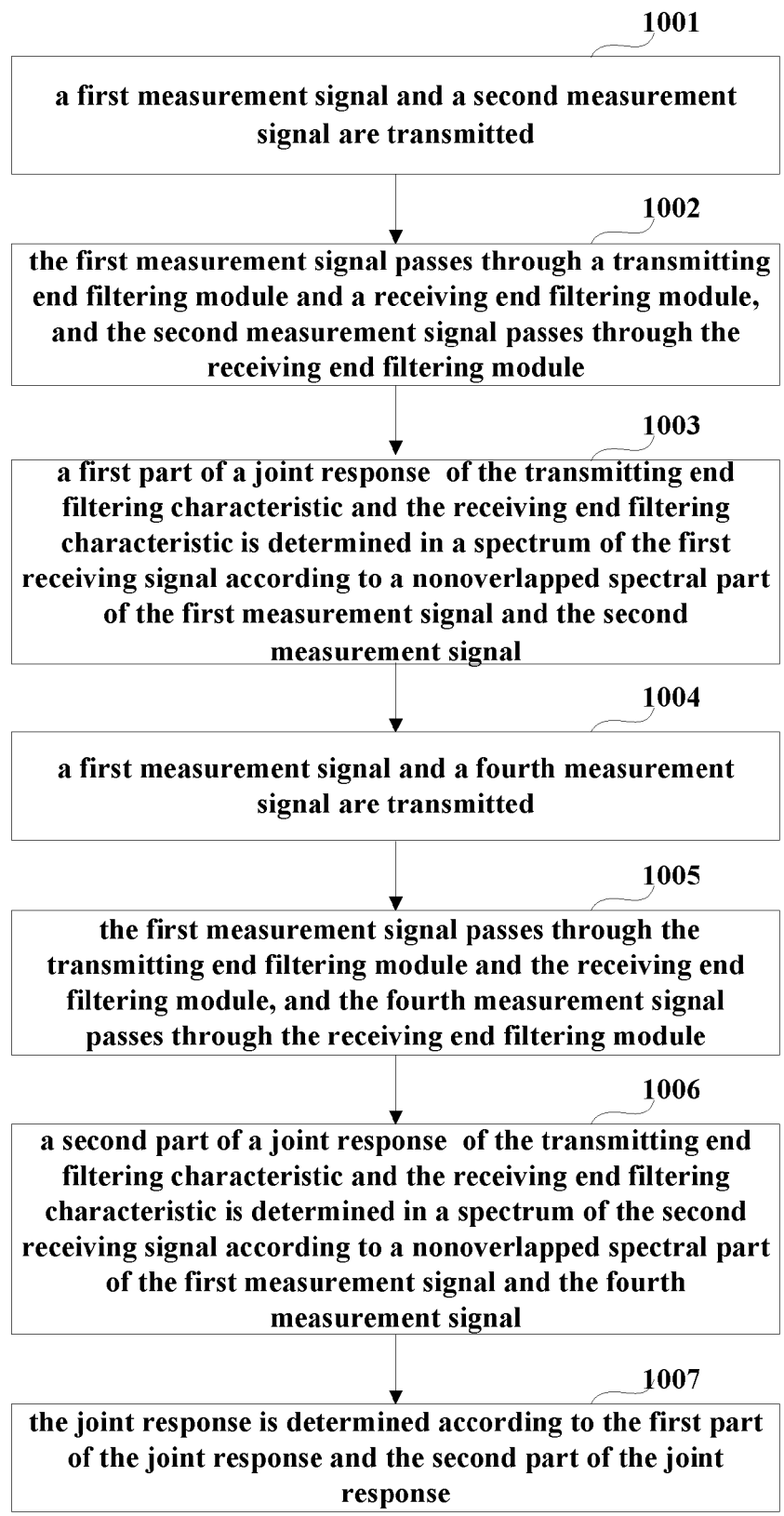
FIG. 10 is a flowchart of the method for measuring a filtering characteristic of Embodiment 2.

FIG. 10 is a flowchart of the method for measuring a filtering characteristic of Embodiment 2 of the present disclosure. Referring to FIG. 10, the method includes:

step 1001: a first measurement signal and a second measurement signal are transmitted;

in this embodiment, the spectral ranges of the first measurement signal and the second measurement signal are different, and the first measurement signal and the second measurement signal are continuous signals; wherein, Embodiment 1 may be referred to for a particular implementation of the continuous signals, which shall not be described herein any further;

step 1002: the first measurement signal passes through a transmitting end filtering module and a receiving end filtering module, and the second measurement signal passes through the receiving end filtering module;

in this embodiment, particular implementations of steps 1001 and 1002 are identical to those of steps 301 and 302 in Embodiment 1, and shall not be described herein any further;

step 1003: a first part of a joint response $G_1(f)H_1(f)$ of the transmitting end filtering characteristic and the receiving end filtering characteristic is determined in a spectrum of the first receiving signal according to a nonoverlapped spectral part of the first measurement signal and the second measurement signal;

in this embodiment, as the spectral ranges of the first measurement signal and the second measurement signal are different, overlapped first measurement signal and second measurement signal are easy to be separated; hence, the nonoverlapped spectra of the first measurement signal and the second measurement signal may be used to determine $G_1(f)H_1(f)$, and the nonoverlapped spectral part is a response of $S_1(f)G(f)H(f)$ of the nonoverlapped spectra of the first measurement signal and the second measurement signal;

step 1004: a first measurement signal and a fourth measurement signal are transmitted; in this embodiment, the spectral ranges of the fourth measurement signal and the first measurement signal are different, the frequencies of the fourth measurement signal and the second measurement signal are complementary, and the fourth measurement signal and the second measurement signal are continuous signals;

step 1005: the first measurement signal passes through the transmitting end filtering module and the receiving end filtering module, and the fourth measurement signal passes through the receiving end filtering module;

in this embodiment, after the first measurement signal passes through the transmitting end filtering module, the fourth measurement signal is overlapped with the first measurement signal for transmission; a signal obtained after the first measurement signal and the fourth measurement signal passing through identical receiving end filtering module is referred to as a second receiving signal, and if the fourth measurement signal and the first measurement signal are denoted by $S_4(f)$ and $S_1(f)$ respectively, and the second receiving signal is denoted by $R_2(f)$, the receiving signal is $R_2(f)=S_1(f)G(f)H(f)+S_4(f)H(f)$;

step 1006: a second part of a joint response $G_2(f)H_2(f)$ of the transmitting end filtering characteristic and the receiving end filtering characteristic is determined in a spectrum of the second receiving signal according to a nonoverlapped spectral part of the first measurement signal and the fourth measurement signal;

in this embodiment, as the spectral ranges of the first measurement signal and the fourth measurement signal are different, overlapped first measurement signal and fourth measurement signal are easy to be separated; hence, the nonoverlapped spectra of first measurement signal and the fourth measurement signal may be used to determine $G_2(f)H_2(f)$, and the nonoverlapped spectral part is a response of $S_1(f)G_2(f)H_2(f)$ of the nonoverlapped spectra of the first measurement signal and the fourth measurement signal;

step 1007: the joint response is determined according to the first part of the joint response and the second part of the joint response.

It can be seen from this embodiment that measurement is performed twice on different measurement signals of different spectral ranges passing through different filtering modules, and the joint response $G(f)H(f)$ may be determined by using the transmitter and the receiver themselves, with no need of use of extra instrument, thereby avoiding the problems of high cost and uneasy large-scale use brought about by measurement of filtering characteristic by using instruments.

In this embodiment, in steps 1001 and 1004, an emitter of a transmitter or a transceiver may be used to transmit the first measurement signal, the second measurement signal and the fourth measurement signal; in steps 1002 and 1005, the transmitting end filtering module is a transmitting end filtering module of a transmitter or a transceiver of which a transmitting end filtering characteristic is to be measured, and the receiving end filtering module is a receiving end filtering module of a receiver or a transceiver of which a receiving end filtering characteristic is to be measured. Taking the transmitter shown in FIG. 1 as an example, when the receiving end filtering characteristic is measured, the pre-equalizer 102 of the transmitter 100 is disabled, and the emitter 101 transmits the first measurement signal to the digital-to-analog converting module 103, and transmits the second measurement signal and the fourth measurement signal to the optical coherent demodulator 201, respectively.

In this embodiment, in steps 1001 and 1004, when the first measurement signal, the fourth measurement signal and the second measurement signal are transmitted, the original emitter of the transmitter or the transceiver is reused, and a specifically provided emitter may also be used to transmit the above first measurement signal, the fourth measurement signal or the second measurement signal. Then the first measurement signal is made to pass through the transmitting end filtering module, without passing through the pre-equalizer, and the second measurement signal and the fourth measurement signal are made to pass through the receiving end filtering module.

In this embodiment, the part of the filtering characteristic of the receiving end may be obtained in steps 1003 and 1006 in the following manner. For example, the spectral range of the second measurement signal is [0, $f_1$], the spectral range of the fourth measurement signal is $$\left[f_1, \frac{f_s}{2}\right],$$

and the spectral range of the first measurement signal is $$\left[0, \frac{f_s}{2}\right].$$

However, this embodiment is not limited thereto. For example, the spectral ranges of the second measurement signal and the fourth measurement signal are interchangeable.

In the first time of measurement in step 1003, the power spectral density of the first receiving signal is calculated, and a fifth power spectral density of the nonoverlapped spectral part of the first measurement signal and second measurement signal is extracted from the spectrum of the power spectral density of the first receiving signal, so as to obtain the first part of the joint response.

In this embodiment, as the spectral range of the second measurement signal covers only a part of all measurement range and the spectral range of the first measurement signal covers all measurement range, the nonoverlapped spectral part of the first measurement signal and second measurement signal corresponds to the spectrum of the first measurement signal with the spectral part of the second measurement signal being removed. As the second measurement signal only passes through the receiving end filtering module, the extracted fifth power spectral density is $$N|G(f)H(f)|^2 \left(f \in \left[f_1, \frac{f_s}{2}\right]\right);$$

where, N is a value of the power spectral density of the first measurement signal. And as relative responses of the frequency points are important, when the first measurement signal has a flat power spectral density, N needs not to be learnt, and the first part of the joint response may be calculated by extracting a root of the fifth power spectral density; or as N is a known value, the root of the fifth power spectral density is extracted after N is removed therefrom, so as to obtain the first part of the joint response $$|G(f)H(f)|\left(f \in \left[f_1, \frac{f_s}{2}\right]\right).$$

In the second time of measurement in step 1006, the power spectral density of the second receiving signal is calculated, and a sixth power spectral density of the non-overlapped spectral part of the first measurement signal and fourth measurement signal is extracted from the spectrum of the power spectral density of the second receiving signal, so as to obtain the second part of the joint response.

In this embodiment, as the spectral range of the fourth measurement signal covers only another part of all measurement range and the spectral range of the first measurement signal covers all measurement range, the nonoverlapped spectral part of the fourth measurement signal and first measurement signal corresponds to the spectrum of the first measurement signal with the spectral part of the fourth measurement signal being removed. As the fourth measurement signal only passes through the receiving end filtering module, the extracted sixth power spectral density is $N|G(f)H(f)|^2 (f \in [0, f_1])$. And the second part of the joint response $|G(f)H(f)|(f \in [0, f_1])$ is obtained according to the sixth power spectral density, with a particular implementation being identical to that of obtaining the first part of the joint response, and being not going to be described herein any further.

In step 1007, the joint response is determined according to the first part of the joint response and the second part of the joint response.

For example, the fifth power spectral density and the sixth power spectral density are integrated, so as to obtain $|G(f)H(f)|$ in the whole measurement range.

In an implementation, when the responses of the first part of the joint response and the second part of the joint response are identical at the overlapped frequency point, the first part of the joint response and the second part of the joint response are combined directly, so as to obtain the consecutive joint response.

In another implementation, when the responses of the first part of the joint response and the second part of the joint response are different at the overlapped frequency point, the responses of the first part of the joint response and the second part of the joint response at the overlapped frequency point are adjusted to be identical, and the adjusted first part of the joint response and second part of the joint response are combined, so as to obtain the consecutive joint response.

In this embodiment, alternatively, the method may further include: determining the filtering characteristic of the receiving end.

Figure 11:
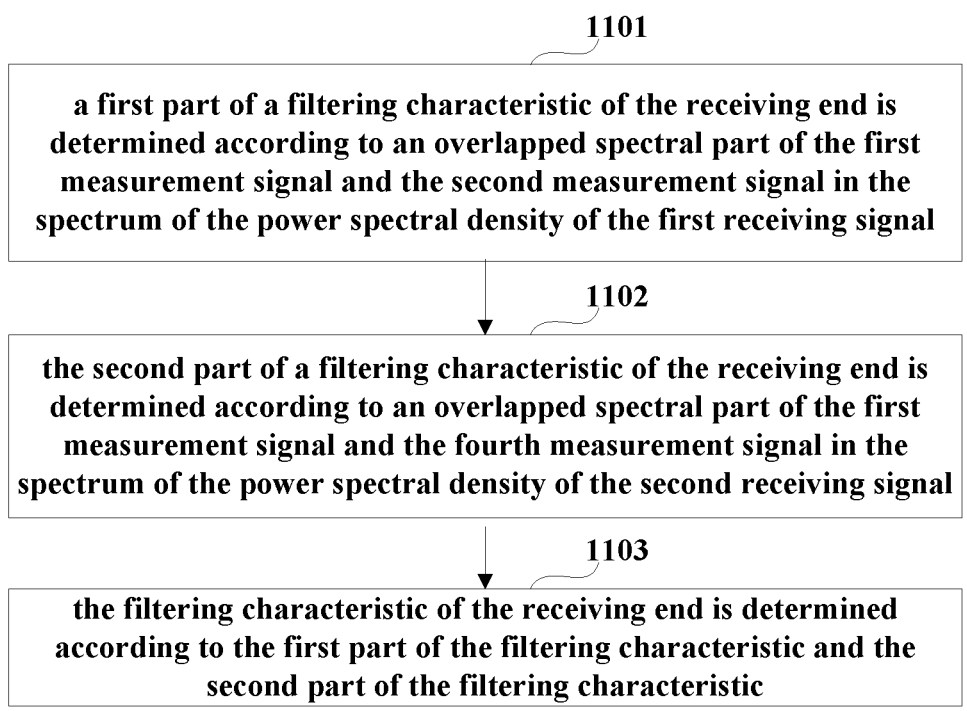
FIG. 11 is a flowchart of a method for determining a filtering characteristic of a receiving end of Embodiment 2.

FIG. 11 is a flowchart of a method for determining the filtering characteristic of the receiving end of this embodiment. As shown in FIG. 11, the method includes:

step 1101: a first part of a filtering characteristic of the receiving end is determined according to an overlapped spectral part of the first measurement signal and the second measurement signal in the spectrum of the power spectral density of the first receiving signal;

step 1102: the second part of a filtering characteristic of the receiving end is determined according to an overlapped spectral part of the first measurement signal and the fourth measurement signal in the spectrum of the power spectral density of the second receiving signal; and step 1103: the filtering characteristic of the receiving end is determined according to the first part of the filtering characteristic and the second part of the filtering characteristic.

In the first time of measurement in step 1101, as the spectral range of the second measurement signal covers only a part of all measurement range and the spectral range of the first measurement signal covers all measurement range, the overlapped spectral part of the first measurement signal and second measurement signal corresponds to the spectrum of the second measurement signal. As the second measurement signal only passes through the receiving end filtering module, a seventh power spectral density of the overlapped spectral part of the first measurement signal and second measurement signal extracted from the spectrum of the power spectral density of the first receiving signal is A|H(f)|²(f∈[0, f₁]); where, A is a value of the power spectral density of the second measurement signal. And as the relative responses of the frequency points are important, when the second measurement signal has a flat power spectral density, A needs not to be learnt, and the first part of the filtering characteristic may be calculated by extracting a root of the seventh power spectral density; or as A is a known value, the root of the seventh power spectral density is extracted after A is removed therefrom, so as to obtain the first part of the filtering characteristic |H(f)|(f∈[0, f₁]).

In the second time of measurement in step 1102, as the spectral range of the fourth measurement signal covers only another part of all measurement range and the spectral range of the first measurement signal covers all measurement range, the overlapped spectral part of the first measurement signal and fourth measurement signal corresponds to the spectrum of the fourth measurement signal. As the fourth measurement signal only passes through the receiving end filtering module, an eighth power spectral density of the overlapped spectral part of the first measurement signal and fourth measurement signal extracted from the spectrum of the power spectral density of the second receiving signal is $$B|H(f)|^2\left(f \in \left[f_1, \frac{f_s}{2}\right]\right);$$

where, B is a value of the power spectral density of the fourth measurement signal. And as the relative responses of the frequency points are important, when the fourth measurement signal has a flat power spectral density, B needs not to be learnt, and the second part of the filtering characteristic may be calculated by extracting a root of the eighth power spectral density; or as B is a known value, the root of the eighth power spectral density is extracted after B is removed therefrom, so as to obtain the second part of the filtering characteristic $$|H(f)|\left(f \in \left[f_1, \frac{f_s}{2}\right]\right).$$

In step 1103, the seventh power spectral density and the eighth power spectral density may be integrated, so as to obtain a filtering characteristic in the whole measurement range.

In an implementation, when the responses of the first part of the filtering characteristic and the second part of the filtering characteristic are identical at the overlapped frequency point, the first part of the filtering characteristic and the second part of the filtering characteristic are combined directly, so as to obtain the consecutive filtering characteristic of the receiving end.

In another implementation, when the responses of the first part of the filtering characteristic and the second part of the filtering characteristic are different at the overlapped frequency point, the responses of the first part of the filtering characteristic and the second part of the filtering characteristic at the overlapped frequency point are adjusted to be identical, and the adjusted first part of the filtering characteristic and second part of the filtering characteristic are combined, so as to obtain the consecutive filtering characteristic of the receiving end.

In this embodiment, the spectra of the first measurement signal, the second measurement signal and the fourth measurement signal may be set to be of any shapes, but should not be zero in the spectral range needing to be measured. And when the first measurement signal, the second measurement signal and the fourth measurement signal have no flat power spectral densities, in steps 1003 and 1006, the power spectral density N of the first measurement signal needs to be removed from the fifth power spectral density and the sixth power spectral density, so as to obtain the first part of the joint response and the second part of the joint response, in step 1101, the power spectral density A of the second measurement signal needs to be removed from the seventh power spectral density, so as to determine the first part of the filtering characteristic, and in step 1102, the power spectral density B of the fourth measurement signal needs to be removed from the eighth power spectral density, so as to determine the second part of the filtering characteristic.

In this embodiment, in order to improve accuracy of the measurement, in measuring the respective filtering characteristics of the transmitter, the receiver or the transceiver, a transmitter laser and a local laser are set to be having identical frequencies. However, this embodiment is not limited thereto. For example, when there exists a frequency offset Δf between the transmitter laser and the local laser, the frequency offset Δf may be estimated according to the related art, and influence of Δf is removed, and furthermore, phase noises of the lasers may also be removed.

In this embodiment, after the filtering characteristic of the receiving end and the above joint response are determined, the filtering characteristic of the transmitting end may be determined, with a method of determination being similar to that in Embodiment 1, and being not going to be described herein any further.

As the methods for determining the filtering characteristic of the receiving end and the joint response are similar to those in Embodiment 1, examples in Embodiment 1 may be referred to for details, which shall not be described herein any further.

In this embodiment, alternatively, when the emitters and filtering modules of the transmitter, the receiver or the transceiver are used in steps 1001 and 1102 and steps 1004 and 1005, the method may further include: setting the pre-equalizer of the transmitter or the transceiver, so as to disable the pre-equalizer.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

Embodiment 3

Embodiment 3 of the present disclosure provides a method for measuring a filtering characteristic. In this embodiment, what differs from embodiments 1 and 2 is that the second measurement signal is only transmitted in the first time of measurement, and the first measurement signal is only transmitted in the second time of measurement.

Figure 12:
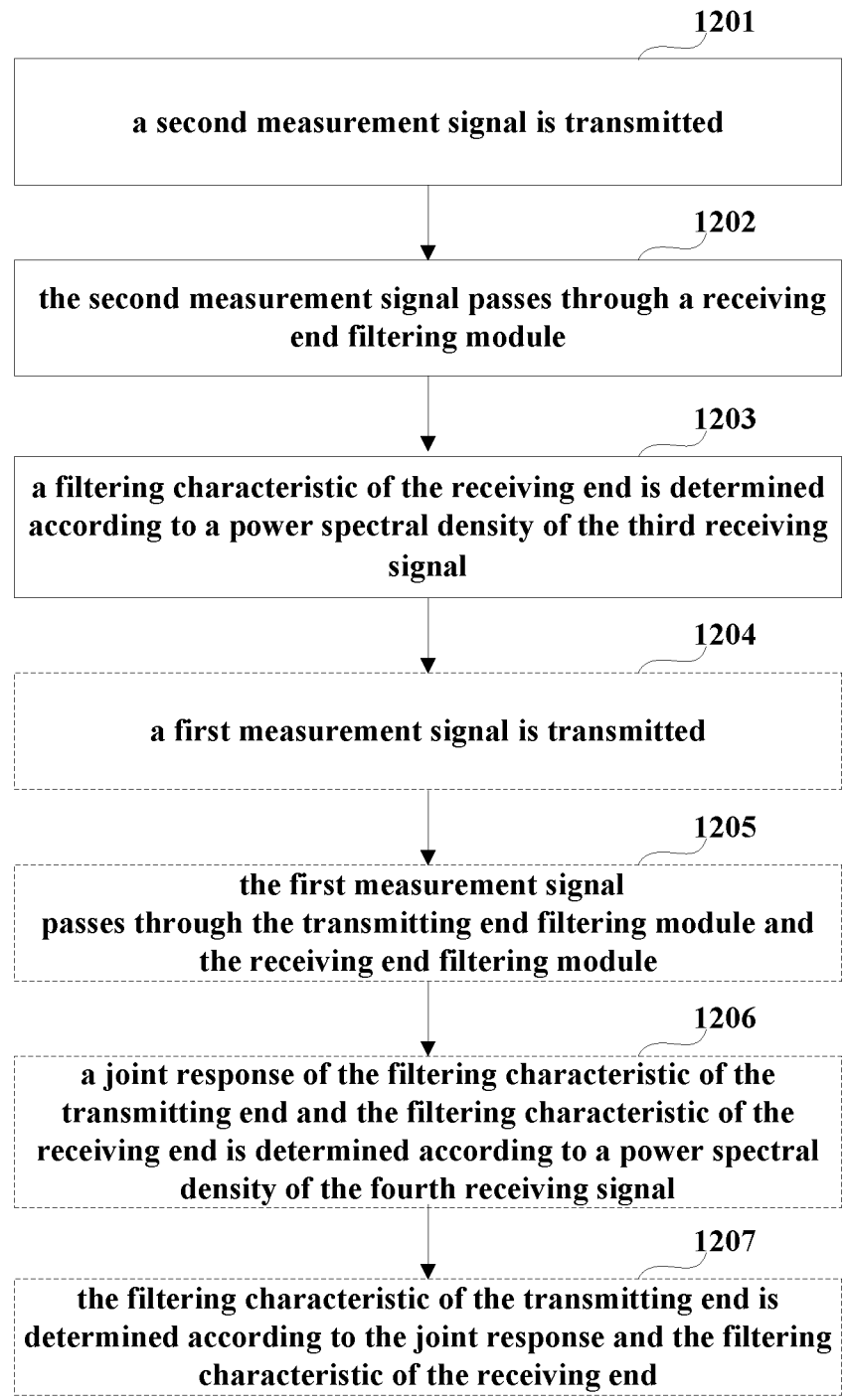
FIG. 12 is a flowchart of the method for measuring a filtering characteristic of Embodiment 3.

FIG. 12 is a flowchart of the method for measuring a filtering characteristic of Embodiment 3 of the present disclosure. Referring to FIG. 12, the method includes:

step 1201: a second measurement signal is transmitted;

step 1202: the second measurement signal passes through a receiving end filtering module;

wherein, the second measurement signal does not pass through a transmitting end filtering module, and a third receiving signal $R_3(f)$ is obtained after the second measurement signal passes through the receiving end filtering module, which is expressed as $R_3(f)=S_2(f) H(f)$.

step 1203: a filtering characteristic of the receiving end is determined according to a power spectral density of the third receiving signal.

In this embodiment, as the second measurement signal only passes through the receiving end filtering module, a power spectral density of the third receiving signal $R_3(f)$ may be expressed as $P_{s_2(f)}|H(f)|^2$; wherein, when $P_{s_2(f)}$ is flat, $P_{s_2(f)}$ may be neglected, and the filtering characteristic of the receiving end may be determined; and when $P_{s_2(f)}$ is not flat, as $P_{s_2(f)}$ is known, the filtering characteristic $|H(f)|$ of the receiving end may be determined according to the power spectral density $P_{s_2(f)}|H(f)|^2$ of the third receiving signal $R_3(f)$.

It can be seen from this embodiment that the filtering characteristic of the receiving end may be determined by using the measurement signal passing through the receiving end filtering module as well as the transmitter and the receiver themselves, with no need of use of extra instrument, thereby avoiding the problems of high cost and uneasy large-scale use brought about by measurement of filtering characteristic by using instruments.

In this embodiment, alternatively, the method may further include: determining a joint response of the filtering characteristic of the receiving end and a filtering characteristic of a transmitting end. As shown in FIG. 12, the method further includes:

step 1204: a first measurement signal is transmitted;

step 1205: the first measurement signal passes through the transmitting end filtering module and the receiving end filtering module;

wherein, a fourth receiving signal $R_4(f)$ is obtained after the first measurement signal passes through the transmitting end filtering module and the receiving end filtering module, which is expressed as $R_4(f)=S_1(f)G(f)H(f)$;

step 1206: a joint response of the filtering characteristic of the transmitting end and the filtering characteristic of the receiving end is determined according to a power spectral density of the fourth receiving signal.

In this embodiment, as the first measurement signal passes through the transmitting end filtering module and the receiving end filtering module, a power spectral density of the fourth receiving signal may be expressed as $P_{s_4(f)}|G(f)H(f)|^2$; wherein, when $P_{s_4(f)}$ is flat, $P_{s_4(f)}$ may be neglected, and the joint response may be determined; and when $P_{s_4(f)}$ is not flat, as $P_{s_4(f)}$ is known, the joint response $|G(f)H(f)|$ may be determined according to the power spectral density $P_{s_4(f)}|G(f)H(f)|^2$ of the fourth receiving signal $R_4(f)$.

In steps 1203 and 1206 of this embodiment, as the power spectral densities of the first measurement signal and the second measurement signal are known, the filtering characteristic of the receiving end and the joint response may be directly determined.

In this embodiment, in order that the obtained filtering characteristic covers the whole measurement range, the spectral ranges of the first measurement signal and the second measurement signal cover the whole measurement range with a filtering characteristic needing to be measured.

In this embodiment, steps 1204-1206 may be executed first to determine the joint response, and then step 1201-1203 are executed to determine the filtering characteristic of the receiving end, and this embodiment is not limited thereto.

In this embodiment, alternatively, the method further includes: step 1207: the filtering characteristic of the transmitting end is determined according to the joint response and the filtering characteristic of the receiving end; wherein, Embodiment 1 may be referred to for a particular implementation, which shall not be described herein any further.

In this embodiment, Embodiment 1 may be referred to for particular implementations of steps 1201, 1202, 1204 and 1205, and in this embodiment, In this embodiment, when the emitters and filtering modules of the transmitter, the receiver or the transceiver are used, the method may further include: setting the pre-equalizer of the transmitter or the transceiver, so as to disable the pre-equalizer.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

Embodiment 4

Embodiment 4 of the present disclosure provides an apparatus for measuring a filtering characteristic. In this embodiment, a spectral range of a second measurement signal covers all measurement range of a filtering characteristic, and frequencies of a first measurement signal and a third measurement signal are complementary. As a principle of the apparatus for solving problems is similar to that of the method in Embodiment 1, the implementation of the method in Embodiment 1 may be referred to for implementation of the apparatus, and repeated parts shall not be described herein any further.

Figure 13:
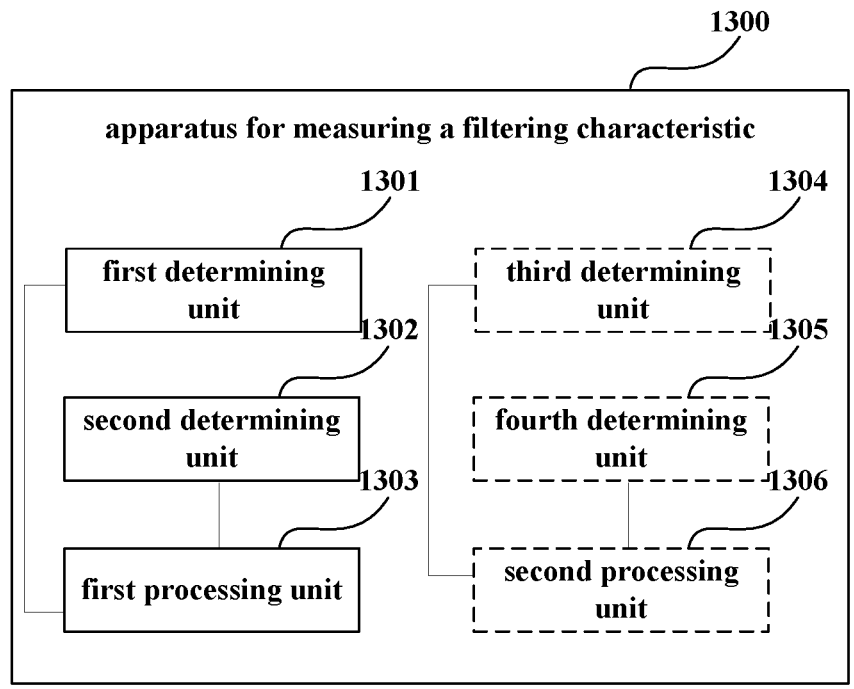
FIG. 13 is a schematic diagram of an apparatus for measuring a filtering characteristic of Embodiment 4.

FIG. 13 is a schematic diagram of an implementation of the apparatus of Embodiment 4. As shown in FIG. 13, the apparatus 1300 includes:

a first determining unit 1301 configured to determine a first part of a filtering characteristic of a receiving end in a spectrum of a first receiving signal obtained after a first measurement signal and a second measurement signal pass through respective filtering modules according to a nonoverlapped spectral part of the first measurement signal and the second measurement signal;

a second determining unit 1302 configured to determine a second part of the filtering characteristic of the receiving end in a spectrum of a second receiving signal obtained after a third measurement signal and the second measurement signal pass through respective filtering modules according to a nonoverlapped spectral part of the third measurement signal and the second measurement signal; and a first processing unit 1303 configured to determine the filtering characteristic of the receiving end according to the first part of the filtering characteristic and the second part of the filtering characteristic.

In this embodiment, Embodiment 1 may be referred to for particular implementations of the first measurement signal, the second measurement signal and the third measurement signal, which shall not be described herein any further.

In this embodiment, steps 303, 306 and 307 in Embodiment 1 may be referred to for particular implementations of the first determining unit 1301, the second determining unit 1302 and the first processing unit 1303, which shall not be described herein any further.

In this embodiment, the first determining unit 1301 may include a first measuring unit (not shown), a first extracting unit (not shown) and a first obtaining unit (not shown); wherein the first measuring unit is configured to calculate a power spectral density of the first receiving signal, the first extracting unit is configured to extract a first power spectral density of the nonoverlapped spectral part of the first measurement signal and the second measurement signal from a spectrum of the power spectral density of the first receiving signal, and the first obtaining unit is configured to obtain the first part of the filtering characteristic of the receiving end according to the first power spectral density.

And the second determining unit 1302 may include a second measuring unit (not shown), a second extracting unit (not shown) and a second obtaining unit (not shown); wherein the second measuring unit is configured to calculate a power spectral density of the second receiving signal, the second extracting unit is configured to extract a second power spectral density of the nonoverlapped spectral part of the third measurement signal and the second measurement signal from a spectrum of the power spectral density of the second receiving signal, and the second obtaining unit is configured to obtain the second part of the filtering characteristic of the receiving end according to the second power spectral density.

Figure 14:
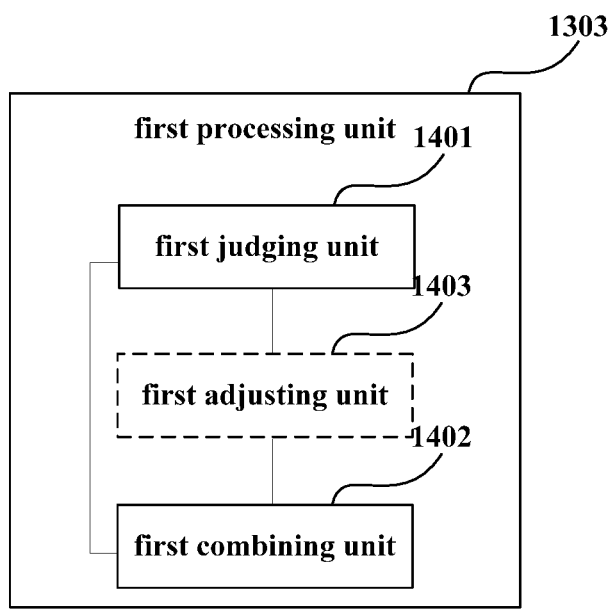
FIG. 14 is a schematic diagram of a first processing unit of Embodiment 4.

FIG. 14 is a schematic diagram of an implementation of the first processing unit 1303 of this embodiment. As shown in FIG. 14, the first processing unit 1303 includes:

a first judging unit 1401 configured to judge whether responses of the first part of the filtering characteristic and the second part of the filtering characteristic are identical at an overlapped frequency point; and a first combining unit 1402 configured to combine the first part of the filtering characteristic and the second part of the filtering characteristic when a result of judgment of the first judging unit 1401 is yes, so as to obtain a consecutive filtering characteristic of the receiving end.

In this embodiment, when the result of judgment of the first judging unit 1401 is no, the first processing unit 1303 may further include:

a first adjusting unit 1403 configured to adjust the responses of the first part of the filtering characteristic and the second part of the filtering characteristic at the overlapped frequency point to be identical; and the first combining unit 1402 is further configured to combine the adjusted first part of the filtering characteristic and second part of the filtering characteristic, so as to obtain the consecutive filtering characteristic of the receiving end.

In this embodiment, the first determining unit 1301 further includes: a first removing unit (not shown) configured to remove the power spectral density of the second measurement signal from the first power spectral density extracted by the first extracting unit when the second measurement signal has no flat power spectral density; and the first obtaining unit determines the first part of the filtering characteristic according to a result of processing of the first removing unit.

And the second determining unit 1302 further includes: a second removing unit (not shown) configured to remove the power spectral density of the second measurement signal from the second power spectral density extracted by the second extracting unit when the second measurement signal has no flat power spectral density; and the second obtaining unit determines the second part of the filtering characteristic according to a result of processing of the second removing unit.

In this embodiment, alternatively, the apparatus 1300 may further include:

a third determining unit 1304 configured to determine the first part of the joint response according to an overlapped spectral part of the first measurement signal and the second measurement signal in the spectrum of the power spectral density of the first receiving signal;

a fourth determining unit 1305 configured to determine the second part of the joint response according to an overlapped spectral part of the third measurement signal and the second measurement signal in the spectrum of the power spectral density of the second receiving signal; and a second processing unit 1306 configured to determine the joint response according to the first part of the joint response and the second part of the joint response.

Steps 401-403 in Embodiment 1 may be referred to for particular implementations of the third determining unit 1304, the fourth determining unit 1305 and the second processing unit 1306, which shall not be described herein any further.

In this embodiment, the third determining unit 1304 includes: a third extracting unit (not shown) and a third obtaining unit (not shown); wherein the third extracting unit is configured to extract a third power spectral density of the overlapped spectral part of the first measurement signal and the second measurement signal from the spectrum of the power spectral density of the first receiving signal, and the third obtaining unit is configured to obtain the first part of the joint response according to the third power spectral density.

In this embodiment, the fourth determining unit 1305 may include a fourth extracting unit (not shown) and a fourth obtaining unit (not shown); wherein the fourth extracting unit is configured to extract a fourth power spectral density of the overlapped spectral part of the third measurement signal and the second measurement signal from the spectrum of the power spectral density of the second receiving signal, and the fourth obtaining unit is configured to obtain the second part of the joint response according to the fourth power spectral density.

Figure 15:
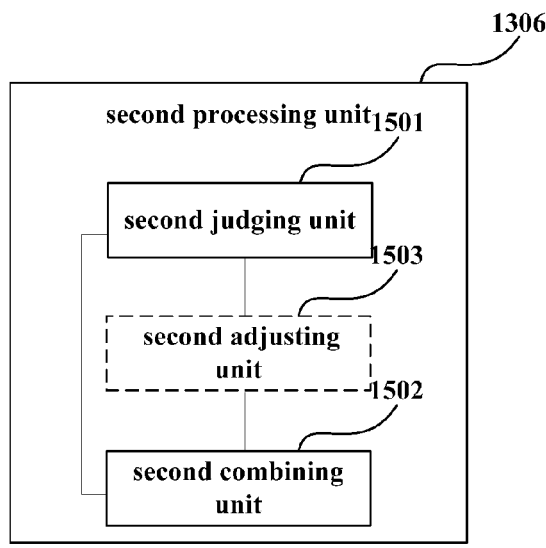
FIG. 15 is a schematic diagram of a second processing unit of Embodiment 4.

FIG. 15 is a schematic diagram of the second processing unit 1306 of this embodiment. As shown in FIG. 15, the second processing unit 1306 includes:

a second judging unit 1501 configured to judge whether responses of the first part of the joint response and the second part of the joint response are identical at an overlapped frequency point; and a second combining unit 1502 configured to combine the first part of the joint response and the second part of the joint response when a result of judgment of the second judging unit 1501 is yes, so as to obtain a consecutive joint response.

In this embodiment, when the result of judgment of the second judging unit 1501 is no, the second processing unit 1306 may further include:

a second adjusting unit 1503 configured to adjust the responses of the first part of the joint response and the second part of the joint response at the overlapped frequency point to be identical; and the second combining unit 1502 is further configured to combine the adjusted first part of the joint response and the second part of the joint response, so as to obtain the consecutive joint response.

In this embodiment, the third determining unit 1304 further includes: a third removing unit (not shown) configured to remove the power spectral density of the first measurement signal from the third power spectral density extracted by the third extracting unit when the first measurement signal and the third measurement signal have no flat power spectral density; and the third obtaining unit determines the first part of the joint response according to a result of processing of the third removing unit.

In this embodiment, the fourth determining unit 1305 further includes: a fourth removing unit (not shown) configured to remove the power spectral density of the third measurement signal from the fourth power spectral density extracted by the fourth extracting unit when the first measurement signal and the third measurement signal have no flat power spectral density; and the fourth obtaining unit determines the second part of the joint response according to a result of processing of the fourth removing unit.

In this embodiment, alternatively, the apparatus 1300 may further include: a sixth processing unit (not shown) configured to determine the filtering characteristic of the transmitting end according to the joint response and the filtering characteristic of the receiving end; wherein, Embodiment 1 may be referred to for a particular implementation of the sixth processing unit, which shall not be described herein any further.

In this embodiment, the first measurement signal and the fourth measurement signal are transmitted by an emitter of a communication equipment of which a filtering characteristic is to be measured, such as a transmitter or a transceiver via the transmitting end filtering module and the receiving end filtering module of the to be measured communication equipment, and the second measurement signal is transmitted via the receiving end filtering module of the communication equipment, and then the filtering characteristics of the transmitting end and the receiving end and the joint response thereof are determined by the apparatus 1300 according to the obtained receiving signals.

In this embodiment, the parts shown in FIG. 13 may be carried out by hardware, software or a combination thereof. A manner of carrying out by using hardware shall be described below with reference to FIG. 16 and taking that an apparatus 1600 determines the filtering characteristic of the receiving end, the filtering characteristic of the transmitting end and the joint response as an example.

Figure 16:
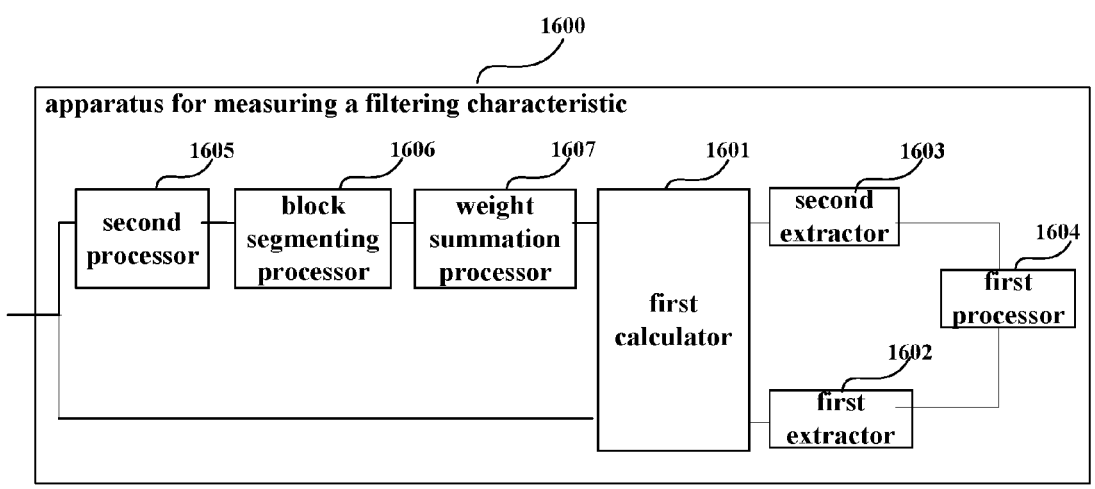
FIG. 16 is a schematic diagram of hardware of an apparatus for measuring a filtering characteristic of Embodiment 4.

FIG. 16 is a schematic diagram of the hardware of the apparatus for measuring a filtering characteristic. As shown in FIG. 16, the apparatus 1600 includes:

a first calculator 1601 configured to calculate the power spectral densities of the first receiving signal and the second receiving signal, which is used to carry out the functions of the above-described first measuring unit and the second measuring unit, with a particular implementation being similar to those of the first measuring unit and the second measuring unit, which shall not be described herein any further;

a first extractor 1602 configured to extract the first power spectral density of the nonoverlapped spectral part of the first measurement signal and the second measurement signal from the spectrum of the power spectral density of the first receiving signal (so as to obtain the first part of the filtering characteristic), and extract the second power spectral density of the nonoverlapped spectral part of the third measurement signal and the second measurement signal from the spectrum of the power spectral density of the second receiving signal (so as to obtain the second part of the filtering characteristic);

wherein, the first extractor 1602 is used to carry out the functions of the above-described first extracting unit, the first obtaining unit, the second extracting unit and the second obtaining unit, with a particular implementation being similar to those of the above-described first extracting unit, the first obtaining unit, the second extracting unit and the second obtaining unit, which shall not be described herein any further;

a second extractor 1603 configured to extract the third power spectral density of the overlapped spectral part of the first measurement signal and the second measurement signal from the spectrum of the power spectral density of the first receiving signal (so as to obtain the first part of the joint response), and extract the fourth power spectral density of the overlapped spectral part of the third measurement signal and the second measurement signal from the spectrum of the power spectral density of the second receiving signal (so as to obtain the second part of the joint response);

wherein, the second extractor 1603 is used to carry out the functions of the above-described third extracting unit, the third obtaining unit, the fourth extracting unit and the fourth obtaining unit, with a particular implementation being similar to those of the above-described third extracting unit, the third obtaining unit, the fourth extracting unit and the fourth obtaining unit, which shall not be described herein any further;

a first processor 1604 configured to determine the filtering characteristic of the receiving end and the joint response according to the results of extraction of the first extractor 1602 and the second extractor 1603, and determine the filtering characteristic of the transmitting end according to the filtering characteristic of the receiving end and the joint response;

wherein, the first processor 1604 is used to carry out the functions of the above-described first processing unit 1303, the second processing unit 1306 and the sixth processing unit; and wherein, the first processing unit 1303 may be referred to for determining the filtering characteristic of the receiving end by the first processor 1604, the second processing unit 1306 may be referred to for determining the joint response by the first processor 1604, and the sixth processing unit may be referred to for determining the filtering characteristic of the transmitting end by the first processor 1604, which shall not be described herein any further.

In this embodiment, the apparatus 1600 may only be configured to determine the filtering characteristic of the receiving end or the filtering characteristic of the transmitting end or the joint response, or determine two or more of the above, and this embodiment is not limited thereto.

In this embodiment, alternatively, the apparatus may further include: a second processor 1605 configured to remove the frequency offset between the transmitter laser and the local laser and the phase noises; a block segmenting processor 1606 configured to segment the first receiving signal and the second receiving signal into M blocks, wherein temporally consecutive sample values are in each block, a length of each block is an integral multiple of a length of a period of the first measurement signal or the third measurement signal; and a weight summation processor 1607 configured to add up and average signals between the blocks. The second extractor 1603 processes power spectral densities of the signals processed by the weight summation processor 1607 and calculated and processed by the first calculator 1601. As what is extracted by the first extractor 1602 is the power spectral density of the nonoverlapped spectral part, processing of the second processor 1605, the block segmenting processor 1606 and the weight summation processor 1607 is not needed. And the first extractor 1602 directly processes the power spectral densities of the unprocessed receiving signals calculated by the first calculator 1601.

In this embodiment, the frequency offset between the transmitter laser and the local laser and the phase noises may be removed, and interference of the second measurement signal may be suppressed, by the second processor 1605, the block segmenting processor 1606 and the weight summation processor 1607.

In this embodiment, the second extractor 1603 and the first extractor 1602 are further configured to, when the first measurement signal, the second measurement signal and the third measurement signal have no flat power spectral density, remove the power spectral density of the second measurement signal respectively from the first power spectral density and the second power spectral density, so as to determine the first part of the filtering characteristic and the second part of the filtering characteristic; remove the power spectral density of the first measurement signal from the third power spectral density, so as to determine the first part of the joint response; and remove the power spectral density of the third measurement signal from the fourth power spectral density, so as to determine the second part of the joint response. The first removing unit and the second removing unit may be referred to for a particular implementation of the processor, which shall not be described herein any further.

In this embodiment, step 401-404 and steps 501-502 in Embodiment 1 may be referred to for particular implementations of the first calculator 1601, the first extractor 1602, the second extractor 1603, the first processor 1604 and the subtractor 1605, which shall not be described herein any further.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

Embodiment 5

Embodiment 5 of the present disclosure provides an apparatus for measuring a filtering characteristic. As a principle of the apparatus for solving problems is similar to that of the method in Embodiment 2, the implementation of the method in Embodiment 2 may be referred to for implementation of the apparatus, and repeated parts shall not be described herein any further.

In this embodiment, what differs from Embodiment 4 exists in that in this embodiment, the spectral range of the first measurement signal covers whole measurement range of a filtering characteristic, and frequencies of the second measurement signal and the fourth measurement signal are complementary.

In this embodiment, description shall be given with reference to FIG. 13. As shown in FIG. 13, the first determining unit 1301 is configured to determine a first part of a joint response of a filtering characteristic of a transmitting end and a filtering characteristic of a receiving end in a spectrum of a first receiving signal according to a nonoverlapped spectral part of a first measurement signal and a second measurement signal; the second determining unit 1302 is configured to determine a second part of the joint response of the filtering characteristic of the transmitting end and the filtering characteristic of the receiving end in a spectrum of a second receiving signal obtained after a fourth measurement signal and the first measurement signal pass through respective filtering modules, according to a nonoverlapped spectral part of the fourth measurement signal and the first measurement signal; and the first processing unit 1303 is configured to determine the joint response according to the first part of the joint response and the second part of the joint response.

In this embodiment, Embodiment 2 may be referred to for particular implementations of the first measurement signal, the second measurement signal and the fourth measurement signal, which shall not be described herein any further.

In this embodiment, steps 1003, 1006 and 1007 in Embodiment 2 may be referred to for particular implementations of the first determining unit 1301, the second determining unit 1302 and the first processing unit 1303, which shall not be described herein any further.

In this embodiment, the first determining unit 1301 may include a first measuring unit (not shown), a fifth extracting unit (not shown) and a fifth obtaining unit (not shown); wherein the first measuring unit is configured to calculate a power spectral density of the first receiving signal, the fifth extracting unit is configured to extract a fifth power spectral density of the nonoverlapped spectral part of the first measurement signal and the second measurement signal from a spectrum of the power spectral density of the first receiving signal, and the fifth obtaining unit is configured to obtain the first part of the joint response according to the fifth power spectral density.

In this embodiment, the second determining unit 1302 may include a second measuring unit (not shown), a sixth extracting unit (not shown) and a sixth obtaining unit (not shown); wherein the second measuring unit is configured to calculate the power spectral density of the second receiving signal, the sixth extracting unit is configured to extract a sixth power spectral density of the nonoverlapped spectral part of the first measurement signal and the fourth measurement signal from a spectrum of the power spectral density of the second receiving signal, and the sixth obtaining unit is configured to obtain the second part of the joint response according to the sixth power spectral density.

Figure 17:
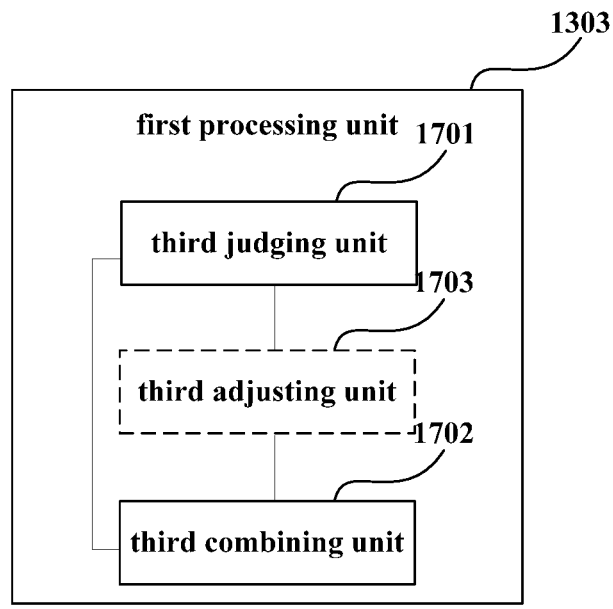
FIG. 17 is a schematic diagram of a first processing unit of Embodiment 5.

FIG. 17 is a schematic diagram of an implementation of the first processing unit 1303 of this embodiment. As shown in FIG. 17, the first processing unit includes:

- a third judging unit 1701 configured to judge whether responses of the first part of joint response and the second part of joint response are identical at an overlapped frequency point; and
- a third combining unit 1702 configured to combine the first part of the joint response and the second part of the joint response when a result of judgment of the third judging unit 1701 is yes, so as to obtain the consecutive joint response.

In this embodiment, when the result of judgment of the third judging unit 1701 is no, the first processing unit 1303 may further include:

- a third adjusting unit 1703 configured to adjust the responses of the first part of the joint response and the second part of the joint response at the overlapped frequency point to be identical; and the third combining unit 1702 is further configured to combine the adjusted first part of the joint response and second part of the joint response, so as to obtain the consecutive joint response.

In this embodiment, the first determining unit 1301 further includes: a fifth removing unit (not shown) configured to remove the power spectral density of the first measurement signal from the fifth power spectral density extracted by the fifth extracting unit when the first measurement signal has no flat power spectral density; and the fifth obtaining unit determines the first part of the joint response according to a result of processing of the fifth removing unit.

And the second determining unit 1302 further includes: a sixth removing unit (not shown) configured to remove the power spectral density of the first measurement signal from the sixth power spectral density extracted by the sixth extracting unit when the first measurement signal has no flat power spectral density; and the sixth obtaining unit determines the second part of the joint response according to a result of processing of the sixth removing unit.

In this embodiment, what differs from Embodiment 4 further exists in that the third determining unit 1304 (corresponding to the fifth determining unit) is configured to determine the first part of the filtering characteristic of the receiving end according to the overlapped spectral part of the first measurement signal and the second measurement signal in the spectrum of the power spectral density of the first receiving signal; the fourth determining unit 1305 (corresponding to the sixth determining unit) is configured to determine the second part of the filtering characteristic of the receiving end according to the overlapped spectral part of the first measurement signal and the fourth measurement signal in the spectrum of the power spectral density of the second receiving signal; and the second processing unit 1306 (corresponding to the third processing unit) is configured to determine the filtering characteristic of the receiving end according to the first part of the filtering characteristic and the second part of the filtering characteristic.

In this embodiment, steps 1101-1103 in Embodiment 2 may be referred to for particular implementations of the third determining unit 1304, the fourth determining unit 1305 and the second processing unit 1306, which shall not be described herein any further.

In this embodiment, the third determining unit 1304 may further include a seventh extracting unit (not shown) and a seventh obtaining unit (not shown). For example, the seventh extracting unit is configured to extract a seventh power spectral density of the overlapped spectral part of the first measurement signal and the second measurement signal from the spectrum of the power spectral density of the first receiving signal, and the seventh obtaining unit is configured to obtain the first part of the filtering characteristic according to the seventh power spectral density.

In this embodiment, the fourth determining unit 1305 includes: an eighth extracting unit (not shown) and an eighth obtaining unit (not shown). For example, the eighth extracting unit is configured to extract an eighth power spectral density of the overlapped spectral part of the fourth measurement signal and the first measurement signal from the spectrum of the power spectral density of the second receiving signal, and the eighth obtaining unit is configured to obtain the second part of the filtering characteristic according to the eighth power spectral density.

Figure 18:
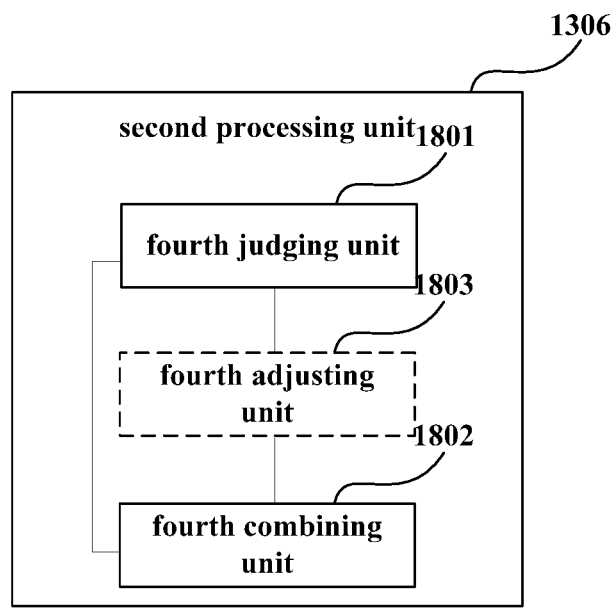
FIG. 18 is a schematic diagram of a second processing unit of Embodiment 5.

FIG. 18 is a schematic diagram of an implementation of the second processing unit 1306 of this embodiment. As shown in FIG. 18, the second processing unit 1306 includes:

- a fourth judging unit 1801 configured to judge whether responses of the first part of filtering characteristic and the second part of filtering characteristic are identical at an overlapped frequency point; and
- a fourth combining unit 1802 configured to combine the first part of the filtering characteristic and the second part of the filtering characteristic when a result of judgment of the fourth judging unit 1801 is yes, so as to obtain the consecutive filtering characteristic of the receiving end.

In this embodiment, when the result of judgment of the fourth judging unit 1801 is no, the second processing unit 1306 may further include:

- a fourth adjusting unit 1803 configured to adjust the responses of the first part of the filtering characteristic and the second part of the filtering characteristic at the overlapped frequency point to be identical; and the fourth combining unit 1802 is further configured to combine the adjusted first part the of filtering characteristic and second part of the filtering characteristic, so as to obtain the consecutive filtering characteristic of the receiving end.

In this embodiment, the third determining unit 1304 further includes: a seventh removing unit (not shown) configured to remove the power spectral density of the second measurement signal from the seventh power spectral density extracted by the seventh extracting unit when the second measurement signal and the fourth measurement signal have no flat power spectral density; and the seventh obtaining unit determines the first part of the filtering characteristic according to a result of processing of the seventh removing unit.

And the fourth determining unit 1305 further includes: an eighth removing unit (not shown) configured to remove the power spectral density of the fourth measurement signal from the eighth power spectral density extracted by the eighth extracting unit when the second measurement signal and the fourth measurement signal have no flat power spectral density; and the eighth obtaining unit determines the second part of the filtering characteristic according to a result of processing of the eighth removing unit.

In this embodiment, what differs from the apparatus 1600 in Embodiment 4 exists in: a first extractor 1602 configured to extract the fifth power spectral density of the nonoverlapped spectral part of the first measurement signal and the second measurement signal from the spectrum of the power spectral density of the first receiving signal (so as to obtain the first part of the joint response), and extract the sixth power spectral density of the nonoverlapped spectral part of the first measurement signal and the fourth measurement signal from the spectrum of the power spectral density of the second receiving signal (so as to obtain the second part of the joint response); a second extractor 1603 configured to extract the seventh power spectral density of the overlapped spectral part of the first measurement signal and the second measurement signal from the spectrum of the power spectral density of the first receiving signal (so as to obtain the first part of the filtering characteristic), and extract the eighth power spectral density of the overlapped spectral part of the first measurement signal and the fourth measurement signal from the spectrum of the power spectral density of the second receiving signal (so as to obtain the second part of the filtering characteristic); and a first processor 1604 configured to determine the joint response and the filtering characteristic of the receiving end according to the results of extraction of the first extractor 1602 and the second extractor 1603, and determine the filtering characteristic of the transmitting end according to the filtering characteristic of the receiving end and the joint response;

wherein, the first extractor 1602 is used to carry out the functions of the above-described fifth extracting unit, the fifth obtaining unit, the sixth extracting unit and the sixth obtaining unit, with a particular implementation being similar to those of the above-described fifth extracting unit, the fifth obtaining unit, the sixth extracting unit and the sixth obtaining unit, and the second extractor 1603 is used to carry out the functions of the above-described seventh extracting unit, the seventh obtaining unit, the eighth extracting unit and the eighth obtaining unit, with a particular implementation being similar to those of the above-described seventh extracting unit, the seventh obtaining unit, the eighth extracting unit and the eighth obtaining unit, which shall not be described herein any further.

In this embodiment, the first extractor 1602 and the second extractor 1603 are further configured to, when the first measurement signal, the second measurement signal and the fourth measurement signal have no flat power spectral density, remove the power spectral density of the first measurement signal respectively from the fifth power spectral density and the sixth power spectral density, so as to obtain the first part of the joint response and the second part of the joint response; remove the power spectral density of the second measurement signal from the seventh power spectral density, so as to determine the first part of the filtering characteristic; and remove the power spectral density of the fourth measurement signal from the eighth power spectral density, so as to determine the second part of the filtering characteristic.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

Embodiment 6

Embodiment 6 of the present disclosure provides an apparatus for measuring a filtering characteristic. As a principle of the apparatus for solving problems is similar to that of the method in Embodiment 3, the implementation of the method in Embodiment 3 may be referred to for implementation of the apparatus, and repeated parts shall not be described herein any further.

Figure 19:
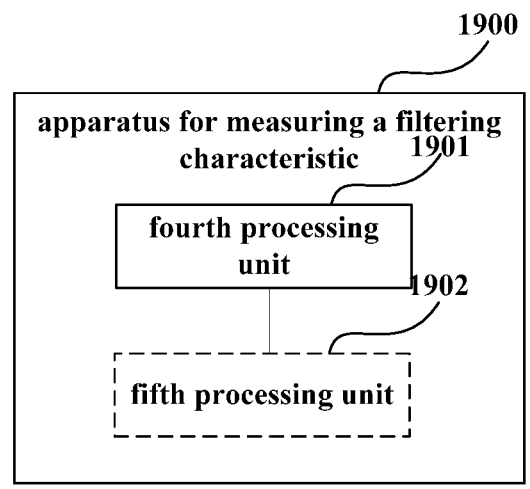
FIG. 19 is a schematic diagram of an apparatus for measuring a filtering characteristic of Embodiment 6.

FIG. 19 is a schematic diagram of an implementation of the apparatus for measuring a filtering characteristic of this embodiment. As shown in FIG. 19, the apparatus includes:

a fourth processing unit 1901 configured to determine a filtering characteristic of a receiving end according to a power spectral density of a third receiving signal obtained after the second measurement signal passes through a receiving end filtering module; wherein, a spectrum of the second measurement signal covers a whole measurement range of the filtering characteristic.

In this embodiment, alternatively, as shown in FIG. 19, the apparatus may further include:

a fifth processing unit 1902 configured to determine a joint response of the filtering characteristic of the receiving end and a filtering characteristic of a transmitting end according to a power spectral density of a fourth receiving signal obtained after a first measurement signal passes through a transmitting end filtering module and the receiving end filtering module; wherein, a spectrum of the first measurement signal covers the whole measurement range of the filtering characteristic.

In this embodiment, Embodiment 3 may be referred to for particular implementations of the second measurement signal and the first measurement signal, and steps 1203 and 1206 in Embodiment 3 may be referred to for particular implementations of the fourth processing unit 1901 and the fifth processing unit 1902, which shall not be described herein any further.

In this embodiment, the apparatus may further include: a sixth processing unit (not shown) configured to determine the filtering characteristic of the transmitting end according to the joint response and the filtering characteristic of the receiving end; wherein, step 1207 in Embodiment 3 may be referred to for a particular implementation of the sixth processing unit, which shall not be described herein any further.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

It should be noted that the apparatuses for measuring a filtering characteristic described above in embodiments 4-6 may be used separately, or may be used in a combined manner. For example, the apparatuses for measuring a filtering characteristic may determine the filtering characteristics of the receiving end and the transmitting end and the joint response in cases where the frequencies of the second measurement signal and the fourth measurement signal are complementary, the frequencies of the first measurement signal and the third measurement signal are complementary, and the spectral ranges of the first measurement signal and the second measurement signal cover the whole measurement range of the filtering characteristic, and this embodiment is not limited thereto.

In this embodiment, alternatively, when the emitter and filtering module of the transmitter or the transceiver are used, the apparatuses for measuring a filtering characteristic in embodiments 4-6 may further include a setting unit (not shown) configured to set the pre-equalizer of the transmitter or the transceiver, so as to disable the pre-equalizer. However, this embodiment is not limited thereto, and the setting unit may also be provided in a transmitter, a receiver, or a transceiver.

Embodiment 7

An embodiment of the present disclosure further provides a communication system, including an apparatus for measuring a filtering characteristic, and further including communication equipment, the communication equipment being a transmitter and a receiver connected to each other, or a transceiver of which a transmitting end and a receiving end are connected, such as being connected in an optical loopback manner; however, this embodiment is not limited thereto.

Figure 20:
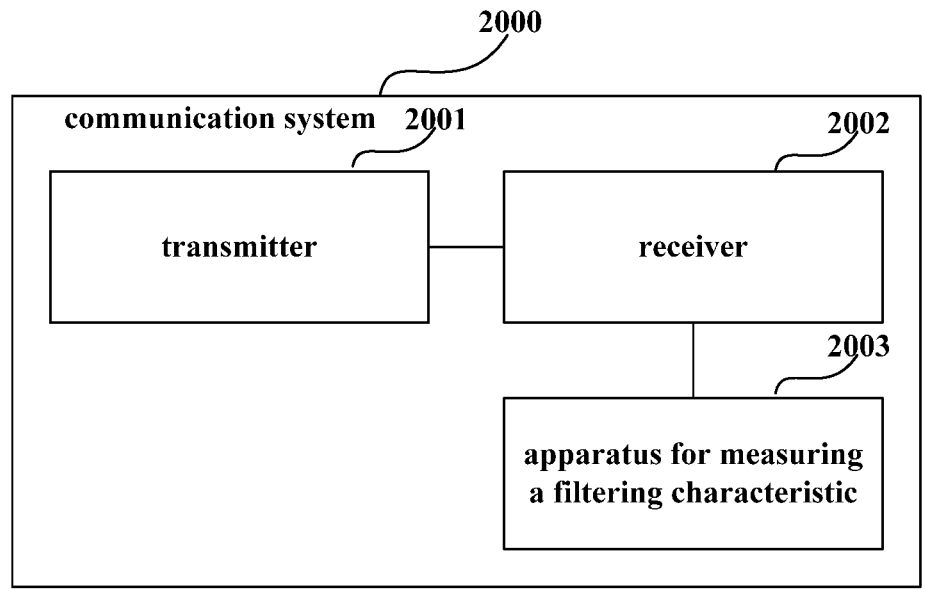
FIG. 20 is a schematic diagram of an implementation of a communication system of Embodiment 7.

FIG. 20 is a schematic diagram of an implementation of the communication system of Embodiment 7. As shown FIG. 20, the communication system includes a transmitter 2001 and a receiver 2002 connected to each other, and an apparatus 2003 for measuring a filtering characteristic.

In this embodiment, the apparatus 1300 or 1900 for measuring a filtering characteristic in embodiments 4-6 may be referred to for a particular implementation of the apparatus 2003 for measuring a filtering characteristic, which is configured to measure a filtering characteristic of the receiving end, a filtering characteristic of the transmitting end, or a joint response, with a structure being as that described in the above embodiments, which shall not be described herein any further.

Figure 2:
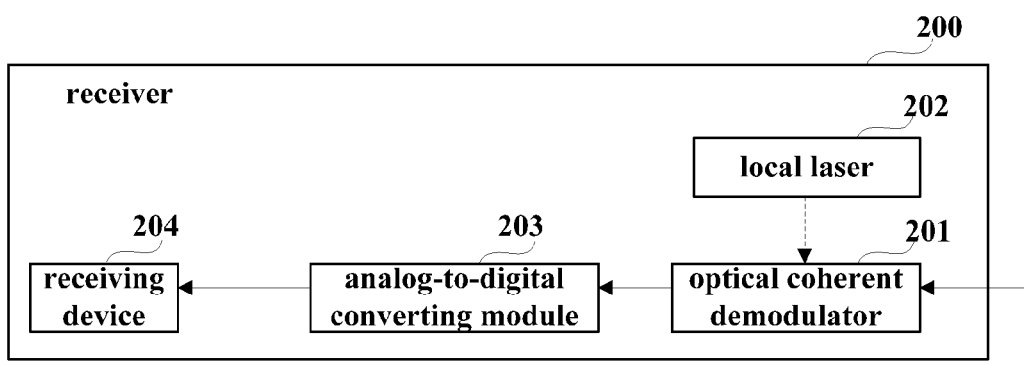
FIG. 2 is a schematic diagram of a receiver in the related art.

FIGS. 1 and 2 may be referred to for particular schematic diagrams of the transmitter 2001 and the receiver 2002, which shall not be described herein any further. What differs from the transmitter and the receiver in FIGS. 1 and 2 exists in that in this embodiment, the emitter in the transmitter 2001 is configured to transmit the above-described first measurement signal, second measurement signal, third measurement signal and fourth measurement signal; wherein, embodiments 1-3 may be referred to for particular implementations of the first measurement signal, second measurement signal, third measurement signal and fourth measurement signal, which shall not be described herein any further. Or, a new emitter may be provided in the transmitter 2001 or the receiver 2002, which is configured to transmit the second measurement signal and the fourth measurement signal; wherein, the structures of the transmitter and the receiver are illustrative only; for example, the transmitter and the receiver may further include other modules, which shall not be described herein any further.

In an implementation, a pre-equalizer of the transmitter 2001 is disabled by a setting unit in the apparatus for measuring a filtering characteristic of the communication system (which may also be provided in the transmitter or the receiver). In a first time of measurement, the emitter of the transmitter 2001 transmits a first measurement signal, passing through respective filtering modules of a transmitting end and a receiving end, and transmits a second measurement signal, passing through the above filtering module of the receiving end; then the receiver 2002 transmits a first receiving signal obtained by the receiving end to the apparatus for measuring a filtering characteristic. In a second time of measurement, the emitter of the transmitter 2001 transmits a third measurement signal, passing through the respective filtering modules of the transmitting end and the receiving end, and transmits the second measurement signal, passing through the above filtering module of the receiving end; then the receiver 2002 transmits a second receiving signal obtained by the receiving end to the apparatus for measuring a filtering characteristic, which determines a final filtering characteristic of the receiving end or the transmitting end or a joint response, with a particular method being as that described in Embodiment 1, which shall not be described herein any further.

In another implementation, the pre-equalizer of the transmitter 2001 is disabled by the setting unit in the apparatus for measuring a filtering characteristic of the communication system (which may also be provided in the transmitter or the receiver). In a first time of measurement, the emitter of the transmitter 2001 transmits the first measurement signal, passing through respective filtering modules of the transmitting end and the receiving end, and transmits the second measurement signal, passing through the above filtering module of the receiving end; then the receiver 2002 transmits the first receiving signal obtained by the receiving end to the apparatus for measuring a filtering characteristic. In a second time of measurement, the emitter of the transmitter 2001 transmits the first measurement signal, passing through the respective filtering modules of the transmitting end and the receiving end, and transmits a fourth measurement signal, passing through the above filtering module of the receiving end; then the receiver 2002 transmits the second receiving signal obtained by the receiving end to the apparatus for measuring a filtering characteristic, which determines the final filtering characteristic of the receiving end or the transmitting end or the joint response, with a particular method being as that described in Embodiment 2, which shall not be described herein any further.

In a further implementation, the pre-equalizer of the transmitter 2001 is disabled by the setting unit in the apparatus for measuring a filtering characteristic of the communication system (which may also be provided in the transmitter or the receiver). In a first time of measurement, the emitter of the transmitter 2001 transmits the second measurement signal, passing through the filtering module of the receiving end; then the receiver 2002 transmits a third receiving signal obtained by the receiving end to the apparatus for measuring a filtering characteristic. In a second time of measurement, the emitter of the transmitter 2001 transmits the first measurement signal, passing through the filtering module of the transmitting end and the filtering module of the receiving end; then the receiver 2002 transmits a fourth receiving signal obtained by the receiving end to the apparatus for measuring a filtering characteristic, which determines the final filtering characteristic of the receiving end or the transmitting end or the joint response, with a particular method being as that described in Embodiment 3, which shall not be described herein any further.

Figure 21:
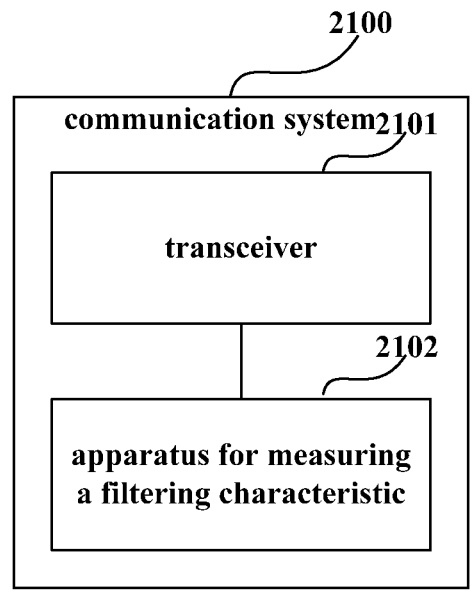
FIG. 21 is a schematic diagram of another implementation of a communication system of Embodiment 7.

FIG. 21 is a schematic diagram of the communication system of Embodiment 7. As shown in FIG. 21, the communication system 2100 includes a transceiver 2101 and an apparatus 2102 for measuring a filtering characteristic; wherein, the apparatus 2102 for measuring a filtering characteristic is configured to measure a filtering characteristic of a receiving end, a filtering characteristic of a transmitting end, or a joint response, a structure of which being as that of the apparatus 1300 or 1900 for measuring a filtering characteristic described in embodiments 4-6, which shall not be described herein any further.

Figure 22:
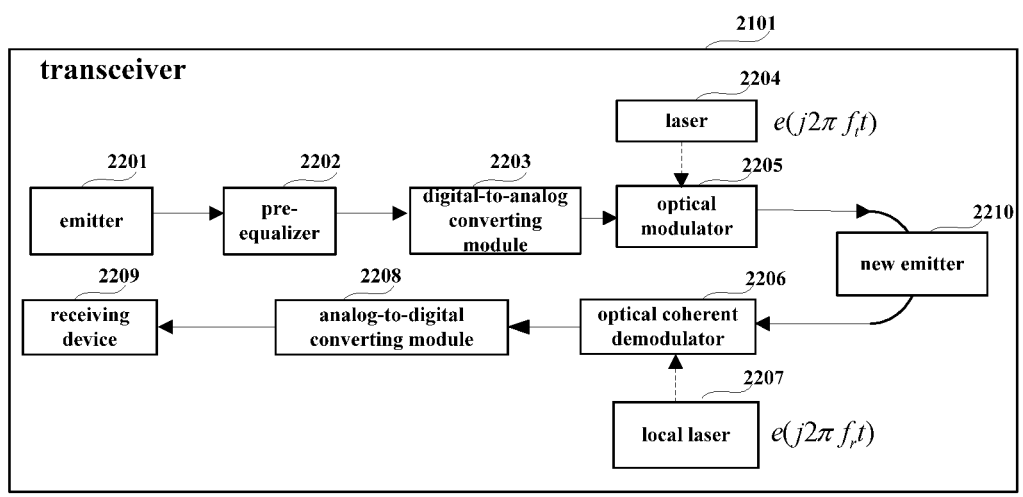
FIG. 22 is a schematic diagram of a transceiver of Embodiment 7.

The transceiver 2101 is configured to transmit a first measurement signal, a second measurement signal, a third measurement signal and a fourth measurement signal; wherein, embodiments 1-3 may be referred to for particular implementations of the first measurement signal, the second measurement signal, the third measurement signal and the fourth measurement signal, which shall not be described herein any further. FIG. 22 is a schematic diagram of the transceiver 2101. As shown in FIG. 22, the transmitting end and the receiving end of the transceiver are connected in an optical loopback manner, and the transceiver 2101 includes: an emitter 2201, a pre-equalizer 2202, a digital-to-analog converting module 2203, a laser 2205, an optical modulator 2204, an optical coherent demodulator 2206, a local laser 2207, an analog-to-digital converting module 2208 and a receiving device 2209, with their particular implementations being similar to the modules of the transmitter and the receiver in FIGS. 1 and 2, which shall not be described herein any further. What differs from the transmitter and the receiver in FIGS. 1 and 2 exists in that in this embodiment, the emitter 2201 in the transceiver 2101 is configured to transmit the first measurement signal, the second measurement signal, the third measurement signal and the fourth measurement signal; or a new emitter 2210 may be provided in the transceiver 2101. For example, the transmitting end and the receiving end may be connected via the emitter 2210, and the second measurement signal and the fourth measurement signal are transmitted by the emitter 2210. For example, the structure of the transceiver is illustrative only the transceiver may further include other modules, which shall not be described herein any further.

In an implementation, a pre-equalizer of the transceiver 2101 is disabled by a setting unit in the apparatus for measuring a filtering characteristic of the communication system. In a first time of measurement, the emitter 2201 of the transceiver 2101 transmits the first measurement signal, passing through respective filtering modules of the transmitting end and the receiving end, and the emitter 2210 transmits the second measurement signal, passing through the above filtering module of the receiving end; then the transceiver 2101 transmits a first receiving signal obtained by the receiving end to the apparatus for measuring a filtering characteristic. In a second time of measurement, the emitter 2201 of the transceiver 2101 transmits the third measurement signal, passing through the respective filtering modules of the transmitting end and the receiving end, and the emitter 2210 transmits the second measurement signal, passing through the above filtering module of the receiving end; then transceiver 2101 transmits a second receiving signal obtained by the receiving end to the apparatus for measuring a filtering characteristic, which determines a final filtering characteristic of the receiving end or the transmitting end or a joint response, with a particular method being as that described in Embodiment 1, which shall not be described herein any further.

In another implementation, the pre-equalizer of the transceiver 2101 is disabled by the setting unit in the apparatus for measuring a filtering characteristic of the communication system. In a first time of measurement, the emitter 2201 of the transceiver 2101 transmits the first measurement signal, passing through respective filtering modules of the transmitting end and the receiving end, and the emitter 2210 transmits the second measurement signal, passing through the above filtering module of the receiving end; then the transceiver 2101 transmits the first receiving signal obtained by the receiving end to the apparatus for measuring a filtering characteristic. In a second time of measurement, the emitter 2201 of the transceiver 2101 transmits the first measurement signal, passing through the respective filtering modules of the transmitting end and the receiving end, and the emitter 2210 transmits the fourth measurement signal, passing through the above filtering module of the receiving end; then the transceiver 2101 transmits the second receiving signal obtained by the receiving end to the apparatus for measuring a filtering characteristic, which determines the final filtering characteristic of the receiving end or the transmitting end or the joint response, with a particular method being as that described in Embodiment 2, which shall not be described herein any further.

In a further implementation, the pre-equalizer of the transmitter 2101 is disabled by the setting unit in the apparatus for measuring a filtering characteristic of the communication system. In a first time of measurement, the emitter 2210 of the transceiver 2101 transmits the second measurement signal, passing through the filtering module of the receiving end; then the transceiver 2101 transmits a third receiving signal obtained by the receiving end to the apparatus for measuring a filtering characteristic. In a second time of measurement, the emitter 2201 of the transceiver 2101 transmits the first measurement signal, passing through a filtering module of the transmitting end and the above filtering module of the receiving end; then the transceiver 2101 transmits a fourth receiving signal obtained by the receiving end to the apparatus for measuring a filtering characteristic, which determines the final filtering characteristic of the receiving end or the transmitting end or the joint response, with a particular method being as that described in Embodiment 3, which shall not be described herein any further.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristics by using instruments.

Embodiment 8

Embodiment 8 of the present disclosure provides communication equipment, which differs from the communication equipment in Embodiment that the functions of the apparatuses for measuring a filtering characteristic in embodiments 4-6 are incorporated into the communication equipment. The communication equipment may be a transmitter, a receiver, or a transceiver. For example, when the communication equipment is a transmitter, in measuring a filtering characteristic, the transmitter is connected to another receiver; when the communication equipment is a receiver, in measuring a filtering characteristic, the receiver is connected to another transmitter; and when the communication equipment is a transceiver, in measuring a filtering characteristic, a transmitting end and a receiving end of the transceiver are connected, such as in an optical loopback manner; however, this embodiment is not limited thereto.

Figure 23:
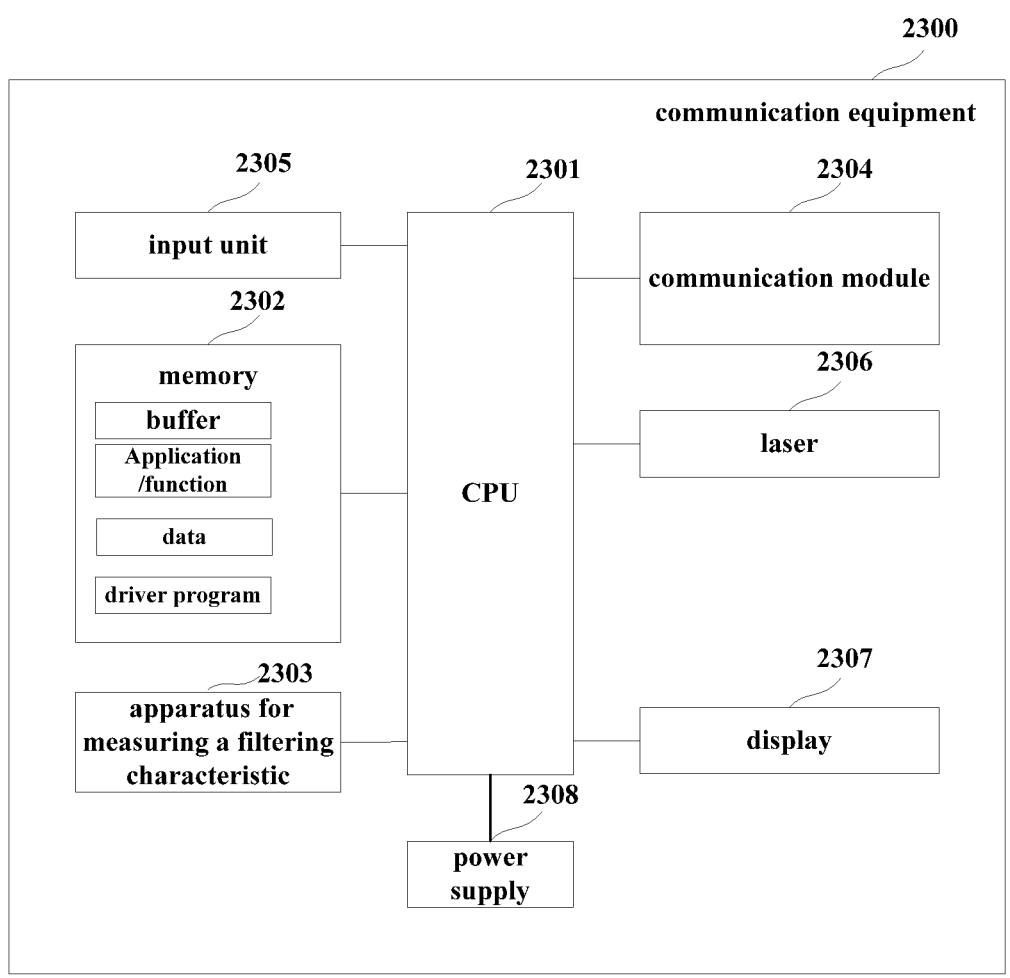
FIG. 23 is a schematic diagram of a communication equipment of Embodiment 8.

FIG. 23 is a schematic diagram of the communication equipment of this embodiment. As shown in FIG. 23, the communication system 2300 may include a central processing unit (CPU) 2301 and a memory 2302, the memory 2302 being coupled to the central processing unit 2301. It should be noted that this figure is illustrative only, and other types of structures may also be used, so as to supplement or replace this structure and achieve telecommunications function or other functions. For example, the central processing unit 2301 is configured to control an emitter to transmit a first measurement signal, a second measurement signal, a third measurement signal, or a fourth measurement signal.

In an implementation, the functions of the apparatuses for measuring a filtering characteristic described in any of embodiments 4-6 may be integrated into the central processing unit 2301.

In this implementation, the central processing unit 2301 may be configured to: determine a first part of a filtering characteristic of a receiving end, or determine a first part of a joint response of a filtering characteristic of a transmitting end and a filtering characteristic of the receiving end, in a spectrum of a first receiving signal obtained after a first measurement signal and a second measurement signal pass through respective filtering modules, according to a nonoverlapped spectral part of the first measurement signal and the second measurement signal; determine a second part of the filtering characteristic of the receiving end in a spectrum of a second receiving signal obtained after a third measurement signal and the second measurement signal pass through respective filtering modules, according to a nonoverlapped spectral part of the third measurement signal and the second measurement signal, or determine a second part of the joint response of the filtering characteristic of the transmitting end and the filtering characteristic of the receiving end, in a spectrum of a second receiving signal obtained after a fourth measurement signal and the first measurement signal pass through respective filtering modules, according to a nonoverlapped spectral part of the fourth measurement signal and the first measurement signal; and determine the filtering characteristic of the receiving end according to the first part of the filtering characteristic and the second part of the filtering characteristic, or determine the joint response of the filtering characteristic of the receiving end and the filtering characteristic of the transmitting end according to the first part of the joint response and the second part of the joint response.

In this embodiment, Embodiment 1 may be referred to for particular implementations of the first measurement signal, second measurement signal, third measurement signal and fourth measurement signal, which shall not be described herein any further.

For example, the central processing unit 2301 may be configured to calculate a power spectral density of the first receiving signal; extract a first power spectral density of the nonoverlapped spectral part of the first measurement signal and the second measurement signal from a spectrum of the power spectral density of the first receiving signal, so as to obtain the first part of the filtering characteristic of the receiving end; calculate a power spectral density of the second receiving signal; and extract a second power spectral density of the nonoverlapped spectral part of the third measurement signal and the second measurement signal from a spectrum of the power spectral density of the second receiving signal, so as to obtain the second part of the filtering characteristic of the receiving end according to the second power spectral density.

For example, the central processing unit 2301 may be configured to judge whether responses of the first part of the filtering characteristic and the second part of the filtering characteristic are identical at an overlapped frequency point; combine the first part of the filtering characteristic and the second part of the filtering characteristic when a result of judgment is yes, so as to obtain a consecutive filtering characteristic; adjust the responses of the first part of the filtering characteristic and the second part of the filtering characteristic at the overlapped frequency point to be identical when the result of judgment is no; and combine the adjusted first part of the filtering characteristic and second part of the filtering characteristic, so as to obtain the consecutive filtering characteristic.

For example, the central processing unit 2301 may be configured to determine the first part of the joint response according to an overlapped spectral part of the first measurement signal and the second measurement signal in the spectrum of the power spectral density of the first receiving signal; determine the second part of the joint response according to an overlapped spectral part of the third measurement signal and the second measurement signal in the spectrum of the power spectral density of the second receiving signal; and determine the joint response according to the first part of the joint response and the second part of the joint response.

For example, the central processing unit 2301 may be configured to extract a third power spectral density of the overlapped spectral part of the first measurement signal and the second measurement signal from the spectrum of the power spectral density of the first receiving signal, so as to obtain the first part of the joint response; and extract a fourth power spectral density of the overlapped spectral part of the third measurement signal and the second measurement signal from the spectrum of the power spectral density of the second receiving signal, so as to obtain the second part of the joint response.

For example, the central processing unit 2301 may be configured to judge whether responses of the first part of the joint response and the second part of the joint response are identical at an overlapped frequency point; combine the first part of the joint response and the second part of the joint response when a result of judgment is yes, so as to obtain a consecutive joint response; adjust the responses of the first part of the joint response and the second part of the joint response at the overlapped frequency point to be identical when the result of judgment is no; and combine the adjusted first part of the joint response and second part of the joint response, so as to obtain the consecutive joint response.

For example, the central processing unit 2301 may be configured to calculate a power spectral density of the first receiving signal; extract a fifth power spectral density of the nonoverlapped spectral part of the first measurement signal and the second measurement signal from a spectrum of the power spectral density of the first receiving signal, so as to obtain the first part of the joint response; calculate a power spectral density of the second receiving signal; extract a sixth power spectral density of the nonoverlapped spectral part of the first measurement signal and the fourth measurement signal from a spectrum of the power spectral density of the second receiving signal, so as to obtain the second part of the joint response.

For example, the central processing unit 2301 may be configured to judge whether responses of the first part of the joint response and the second part of the joint response are identical at an overlapped frequency point; combine the first part of the joint response and the second part of the joint response when a result of judgment is yes, so as to obtain a consecutive joint response; adjust the responses of the first part of the joint response and the second part of the joint response at the overlapped frequency point to be identical when the result of judgment is no; and combine the adjusted first part of the joint response and second part of the joint response, so as to obtain the consecutive joint response.

For example, the central processing unit 2301 may be configured to determine a first part of the filtering characteristic of the receiving end according to an overlapped spectral part of the first measurement signal and the second measurement signal in the spectrum of the power spectral density of the first receiving signal; determine a second part of the filtering characteristic of the receiving end according to an overlapped spectral part of the first measurement signal and the fourth measurement signal in the spectrum of the power spectral density of the second receiving signal; and determine the filtering characteristic of the receiving end according to the first part of the filtering characteristic and the second part of the filtering characteristic of the receiving end.

For example, the central processing unit 2301 may be configured to extract a seventh power spectral density of the overlapped spectral part of the first measurement signal and the second measurement signal from the spectrum of the power spectral density of the first receiving signal, so as to obtain the first part of the filtering characteristic; extract an eighth power spectral density of the overlapped spectral part of the fourth measurement signal and the first measurement signal from the spectrum of the power spectral density of the second receiving signal, so as to obtain the second part of the filtering characteristic.

For example, the central processing unit 2301 may be configured to judge whether responses of the first part of the filtering characteristic and the second part of the filtering characteristic are identical at an overlapped frequency point; combine the first part of the filtering characteristic and the second part of the filtering characteristic when a result of judgment is yes, so as to obtain a consecutive filtering characteristic; adjust the responses of the first part of the filtering characteristic and the second part of the filtering characteristic at the overlapped frequency point to be identical when the result of judgment is no; and combine the adjusted first part of the filtering characteristic and second part of the filtering characteristic, so as to obtain the consecutive filtering characteristic of the receiving end.

In this embodiment, the central processing unit 2301 may further be configured to determine a filtering characteristic of a receiving end according to a power spectral density of a third receiving signal obtained after a second measurement signal passes through a receiving end filtering module; wherein, a spectrum of the second measurement signal covers a whole measurement range of the filtering characteristic.

For example, the central processing unit 2301 may be configured to determine a joint response of the filtering characteristic of the receiving end and a filtering characteristic of a transmitting end according to a power spectral density of a fourth receiving signal obtained after a first measurement signal passes through a transmitting end filtering module and the receiving end filtering module; wherein, a spectrum of the first measurement signal covers a whole measurement range of the filtering characteristic.

For example, the central processing unit 2301 may be configured to determine the filtering characteristic of the transmitting end according to the joint response and the filtering characteristic of the receiving end.

In another implementation, the apparatuses for measuring a filtering characteristic described in embodiments 4-6 and the central processing unit 2301 may be configured separately. For example, the apparatus may be configured as a chip connected to the central processing unit 2301 (see 2303 in FIG. 23), with its functions being realized under control of the central processing unit 2301.

As shown in FIG. 23, the communication equipment 2300 may further include a communication module 2304, an input unit 2305, a display 2307, and a power supply 2308. It should be noted that the communication equipment 2300 does not necessarily include all the parts shown in FIG. 23, and furthermore, the communication equipment 2300 may include parts not shown in FIG. 23, and the related art may be referred to.

In this embodiment, when the communication equipment 2300 is a transmitter, it may further include a laser 2306, and the communication module 2304 is a signal transmitting module, and its structure may be identical to that of an existing transmitter, which may include, as shown in FIG. 1, an emitter 101, a pre-equalizer 102, a digital-to-analog converting module 103, a laser 104 and an optical modulator 105; however, the structure of the communication module 2304 is not limited to the above embodiment.

In this embodiment, when the communication equipment 2300 is a receiver, it may further include a local laser (not shown), but does not include a laser 2306, and the communication module 2304 is a signal receiving module, and its structure may be identical to that of an existing receiver, which may include, as shown in FIG. 2, an optical coherent demodulator 201, an analog-to digital converting module 203 and a receiving device 204; however, the structure of the communication module 2304 is not limited to the above embodiment.

In this embodiment, when the communication equipment 2300 is a transceiver, it may further include a laser 2306 and a local laser (not shown), and the communication module 2304 is a signal transmitting and receiving module, and its structure may be identical to that of an existing transceiver; for example, a transmitting module is similar to a transmitter, and a receiving module is similar to a receiver; however, the structure of the communication module 2304 is not limited to the above embodiment.

In this embodiment, when the apparatus for measuring a filtering characteristic does not include a setting unit, the communication equipment 2300 may further include a setting unit (not shown) configured to set the pre-equalizer of the transmitter or the transceiver, so as to disable the pre-equalizer; however, the setting unit may be carried out by the input unit 2305.

As shown in FIG. 23, the central processing unit 2301 is sometimes referred to as a controller or control, and may include a microprocessor or other processor devices and/or logic devices. The central processing unit 2301 receives input and controls operations of every components of the communication equipment 2300.

For example, the memory 2302 may be, for example, one or more of a buffer memory, a flash memory, a hard drive, a mobile medium, a volatile memory, a nonvolatile memory, or other suitable devices, which may store predefined or preconfigured information, and may further store a program executing related information. And the central processing unit 2301 may execute the program stored in the memory 2302, so as to realize information storage or processing, etc. Functions of other parts are similar to those of the related art, which shall not be described herein any further. The parts of the communication equipment 2300 may be realized by specific hardware, firmware, software, or any combination thereof, without departing from the scope of the present disclosure.

In this embodiment, the communication equipment 2300 is, for example, a transmitter. And in measuring a filtering characteristic, the pre-equalizer in the communication module 2304 is disabled by the setting unit in the apparatus 2303 for measuring a filtering characteristic or the setting unit (such as the input unit 2305) in the communication equipment 2300.

In an implementation, under control of the CPU, the emitter in the communication module 2304 is enabled to transmit the first measurement signal and the second measurement signal. The first measurement signal passes through the transmitting end filtering module of the communication module 2304, and the second measurement signal is overlapped with the first measurement signal passing through the transmitting end filtering module and passes through the receiving end filtering module of the receiver connected to the transmitter. Then, under control of the CPU, the first receiving signal obtained by the receiver connected to the transmitter is transmitted to the apparatus 2303 for measuring a filtering characteristic. Thereafter, under control of the CPU, the emitter in the communication module 2304 is enabled to transmit the third measurement signal and the second measurement signal. The third measurement signal passes through the transmitting end filtering module of the communication module 2304, and the second measurement signal is overlapped with the third measurement signal passing through the transmitting end filtering module and passes through the receiving end filtering module of the receiver connected to the transmitter. Finally, under control of the CPU, the second receiving signal obtained by the receiver connected to the transmitter is transmitted to the apparatus 2303 for measuring a filtering characteristic.

In another implementation, under control of the CPU, the emitter in the communication module 2304 is enabled to transmit the first measurement signal and the second measurement signal. The first measurement signal passes through the transmitting end filtering module of the communication module 2304, and the second measurement signal is overlapped with the first measurement signal passing through the transmitting end filtering module and passes through the receiving end filtering module of the receiver connected to the transmitter. Then, under control of the CPU, the first receiving signal obtained by the receiver connected to the transmitter is transmitted to the apparatus 2303 for measuring a filtering characteristic. Thereafter, under control of the CPU, the emitter in the communication module 2304 is enabled to transmit the first measurement signal and the fourth measurement signal. The first measurement signal passes through the transmitting end filtering module of the communication module 2304, and the fourth measurement signal is overlapped with the first measurement signal passing through the transmitting end filtering module and passes through the receiving end filtering module of the receiver connected to the transmitter. Finally, under control of the CPU, the second receiving signal obtained by the receiver connected to the transmitter is transmitted to the apparatus 2303 for measuring a filtering characteristic.

In a further implementation, under control of the CPU, the emitter in the communication module 2304 is enabled to transmit the first measurement signal only. The first measurement signal passes through the transmitting end filtering module of the communication module 2304 and the receiving end filtering module of the receiver connected to the transmitter. Then, under control of the CPU, the fourth receiving signal obtained by the receiver connected to the transmitter is transmitted to the apparatus 2303 for measuring a filtering characteristic. Thereafter, under control of the CPU, the emitter in the communication module 2304 is enabled to transmit the second measurement signal only, the second measurement signal passing through the receiving end filtering module of the receiver connected to the transmitter. Finally, under control of the CPU, the third receiving signal obtained by the receiver connected to the transmitter is transmitted to the apparatus 2303 for measuring a filtering characteristic.

Finally, the apparatus 2303 determines the final filtering characteristic of the receiving end or the transmitting end or the joint response, with a particular method being as described in embodiments 1-3, which shall not be described herein any further. Furthermore, a new emitter (not shown) may be provided in the communication device 2300, which is configured to transmit at least one of the first measurement signal, the second measurement signal, the third measurement signal and the fourth measurement signal.

In this embodiment, the communication equipment 2300 is, for example, a transceiver. And in measuring a filtering characteristic, the pre-equalizer in the communication module 2304 is disabled by the setting unit in the apparatus 2303 for measuring a filtering characteristic or the setting unit (such as the input unit 2305) in the communication equipment 2300.

In an implementation, under control of the CPU, the emitter in the communication module 2304 is enabled to transmit the first measurement signal and the second measurement signal. The first measurement signal passes through the transmitting end filtering module of the communication module 2304, and the second measurement signal is overlapped with the first measurement signal passing through the transmitting end filtering module and passes through the receiving end filtering module of the communication module 2304. Then, under control of the CPU, the obtained first receiving signal is transmitted to the apparatus 2303 for measuring a filtering characteristic. Thereafter, under control of the CPU, the emitter in the communication module 2304 is enabled to transmit the third measurement signal and the second measurement signal. The third measurement signal passes through the transmitting end filtering module of the communication module 2304, and the second measurement signal is overlapped with the third measurement signal passing through the transmitting end filtering module and passes through the receiving end filtering module of the communication module 2304. Finally, under control of the CPU, the obtained second receiving signal is transmitted to the apparatus 2303 for measuring a filtering characteristic.

In another implementation, under control of the CPU, the emitter in the communication module 2304 is enabled to transmit the first measurement signal and the second measurement signal. The first measurement signal passes through the transmitting end filtering module of the communication module 2304, and the second measurement signal is overlapped with the first measurement signal passing through the transmitting end filtering module and passes through the receiving end filtering module of the communication module 2304. Then, under control of the CPU, the obtained first receiving signal is transmitted to the apparatus 2303 for measuring a filtering characteristic. Thereafter, under control of the CPU, the emitter in the communication module 2304 is enabled to transmit the first measurement signal and the fourth measurement signal. The first measurement signal passes through the transmitting end filtering module of the communication module 2304, and the fourth measurement signal is overlapped with the first measurement signal passing through the transmitting end filtering module and passes through the receiving end filtering module of the communication module 2304. Finally, under control of the CPU, the obtained second receiving signal is transmitted to the apparatus 2303 for measuring a filtering characteristic.

In a further implementation, under control of the CPU, the emitter in the communication module 2304 is enabled to transmit the first measurement signal only. The first measurement signal passes through the transmitting end filtering module of the communication module 2304 and the receiving end filtering module of the communication module 2304. Then, under control of the CPU, the obtained fourth receiving signal is transmitted to the apparatus 2303 for measuring a filtering characteristic. Thereafter, under control of the CPU, the emitter in the communication module 2304 is enabled to transmit the second measurement signal only, the second measurement signal passing through the receiving end filtering module of the communication module 2304. Finally, under control of the CPU, the obtained third receiving signal is transmitted to the apparatus 2303 for measuring a filtering characteristic.

Finally, the apparatus 2303 determines the final filtering characteristic of the receiving end or the transmitting end or the joint response, with a particular method being as described in embodiments 1-3, which shall not be described herein any further. Furthermore, a new emitter (not shown) may be provided in the communication device 2300, which is configured to transmit at least one of the first measurement signal, the second measurement signal, the third measurement signal and the fourth measurement signal.

In this embodiment, the communication equipment 2300 is, for example, a receiver. And in measuring a filtering characteristic, the pre-equalizer of the transmitter connected to the receiver is disabled by the setting unit in the apparatus 2303 for measuring a filtering characteristic or the setting unit (such as the input unit 2305) in the communication equipment 2300.

In an implementation, under control of the CPU, the emitter of the transmitter connected to the receiver is enabled to transmit the first measurement signal and the second measurement signal. The first measurement signal passes through the transmitting end filtering module of the transmitter connected to the receiver, and the second measurement signal is overlapped with the first measurement signal passing through the transmitting end filtering module and passes through the receiving end filtering module of the communication module 2304. Then, under control of the CPU, the obtained first receiving signal is transmitted to the apparatus 2303 for measuring a filtering characteristic. Thereafter, under control of the CPU, the emitter of the transmitter connected to the receiver is enabled to transmit the third measurement signal and the second measurement signal. The third measurement signal passes through the transmitting end filtering module of the transmitter connected to the receiver, and the second measurement signal is overlapped with the third measurement signal passing through the transmitting end filtering module and passes through the receiving end filtering module of the communication module 2304. Finally, under control of the CPU, the obtained second receiving signal is transmitted to the apparatus 2303 for measuring a filtering characteristic.

In another implementation, under control of the CPU, the emitter of the transmitter connected to the receiver is enabled to transmit the first measurement signal and the second measurement signal. The first measurement signal passes through the transmitting end filtering module of the transmitter connected to the receiver, and the second measurement signal is overlapped with the first measurement signal passing through the transmitting end filtering module and passes through the receiving end filtering module of the communication module 2304. Then, under control of the CPU, the obtained first receiving signal is transmitted to the apparatus 2303 for measuring a filtering characteristic. Thereafter, under control of the CPU, the emitter of the transmitter connected to the receiver is enabled to transmit the first measurement signal and the fourth measurement signal. The first measurement signal passes through the transmitting end filtering module of the transmitter connected to the receiver, and the fourth measurement signal is overlapped with the first measurement signal passing through the transmitting end filtering module and passes through the receiving end filtering module of the communication module 2304. Finally, under control of the CPU, the obtained second receiving signal is transmitted to the apparatus 2303 for measuring a filtering characteristic.

In a further implementation, under control of the CPU, the emitter of the transmitter connected to the receiver is enabled to transmit the first measurement signal only. The first measurement signal passes through the transmitting end filtering module of the transmitter connected to the receiver and the receiving end filtering module of the communication module 2304. Then, under control of the CPU, the obtained fourth receiving signal is transmitted to the apparatus 2303 for measuring a filtering characteristic. Thereafter, under control of the CPU, the emitter of the transmitter connected to the receiver is enabled to transmit the second measurement signal only, the second measurement signal passing through the receiving end filtering module of the communication module 2304. Finally, under control of the CPU, the obtained third receiving signal is transmitted to the apparatus 2303 for measuring a filtering characteristic.

Finally, the apparatus 2303 determines the final filtering characteristic of the receiving end or the transmitting end or the joint response, with a particular method being as described in embodiments 1-3, which shall not be described herein any further. Furthermore, a new emitter (not shown) may be provided in the communication device 2300, which is configured to transmit at least one of the first measurement signal, the second measurement signal, the third measurement signal and the fourth measurement signal.

The functions of the above apparatus 2303 determines the final filtering characteristic may be carried out by the CPU 2301, and after obtaining the receiving signals, the CPU 2301 may directly use the methods in embodiments 1-3 to determine the final filtering characteristic of the receiving end or the transmitting end or the joint response, which shall not be described herein any further.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

Embodiment 9

Embodiment 9 further provides an apparatus for measuring a filtering characteristic, which differs from the apparatuses of embodiments 4-6 in that in this embodiment, an emitter of an existing transmitter or a transceiver is not used, and only filtering modules of an existing transmitter, receiver or transceiver are used.

Figure 24:
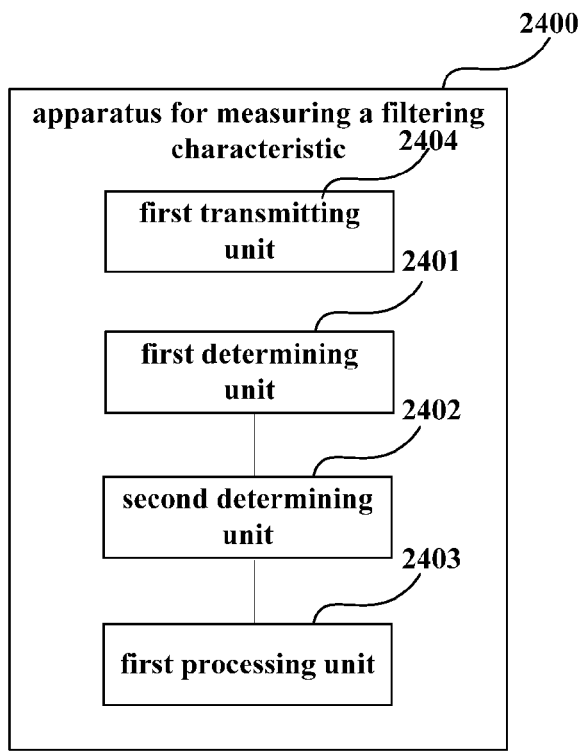
FIG. 24 is a schematic diagram of an apparatus for measuring a filtering characteristic of Embodiment 9.

FIG. 24 is a schematic diagram of an implementation of the apparatus of Embodiment 9. As shown in FIG. 24, the apparatus 2400 includes a first determining unit 2401, a second determining unit 2402 and a first processing unit 2403; wherein, the first determining unit 1301, the second determining unit 1302 and the first processing unit 1303 in embodiments 4-5 may be referred to for particular implementations of the first determining unit 2401, the second determining unit 2402 and the first processing unit 2403, which shall not be described herein any further.

In this embodiment, the apparatus 2400 may further include a first transmitting unit 2404 configured to transmit a first measurement signal, a second measurement signal, a third measurement signal and a fourth measurement signal.

In an implementation, the first measurement signal and the second measurement signal are transmitted first. The first measurement signal passes through a transmitting end filtering module of a transmitter or a transceiver, and the second measurement signal is overlapped with the first measurement signal passing through the transmitting end filtering module and passes through a receiving end filtering module of the transceiver or the receiver, so as to obtain a first receiving signal. Then the third measurement signal and the second measurement signal are transmitted. The third measurement signal passes through the transmitting end filtering module of the transmitter or the transceiver, and the second measurement signal is overlapped with the third measurement signal passing through the transmitting end filtering module and passes through the receiving end filtering module of the transceiver or the receiver, so as to obtain a second receiving signal.

In an implementation, the first measurement signal and the second measurement signal are transmitted first. The first measurement signal passes through the transmitting end filtering module of the transmitter or the transceiver, and the second measurement signal is overlapped with the first measurement signal passing through the transmitting end filtering module and passes through the receiving end filtering module of the transceiver or the receiver, so as to obtain the first receiving signal. Then the first measurement signal and the fourth measurement signal are transmitted. The first measurement signal passes through the transmitting end filtering module of the transmitter or the transceiver, and the fourth measurement signal is overlapped with the first measurement signal passing through the transmitting end filtering module and passes through the receiving end filtering module of the transceiver or the receiver, so as to obtain the second receiving signal.

The first determining unit 2401 and the second determining unit 2402 may obtain the first receiving signal and the second receiving signal, and the first processing unit 2403 determines the final filtering characteristic of the receiving end and the joint response; wherein, embodiments 1-2 may be referred to for particular methods, which shall not be described herein any further.

In this embodiment, as it is not need to make the first measurement signal or the third measurement signal transmitted by the first transmitting unit 2404 pass through a per-equalizer of the existing transmitter or transceiver, the apparatus needs not to include the setting unit in embodiments 4-5.

In this embodiment, a third determining unit, a fourth determining unit, a second processing unit (which is optional and not shown) and a sixth processing unit (not shown) may further be included; wherein, embodiments 4-5 may be referred to for particular implementations, which shall not be described herein any further.

Figure 25:
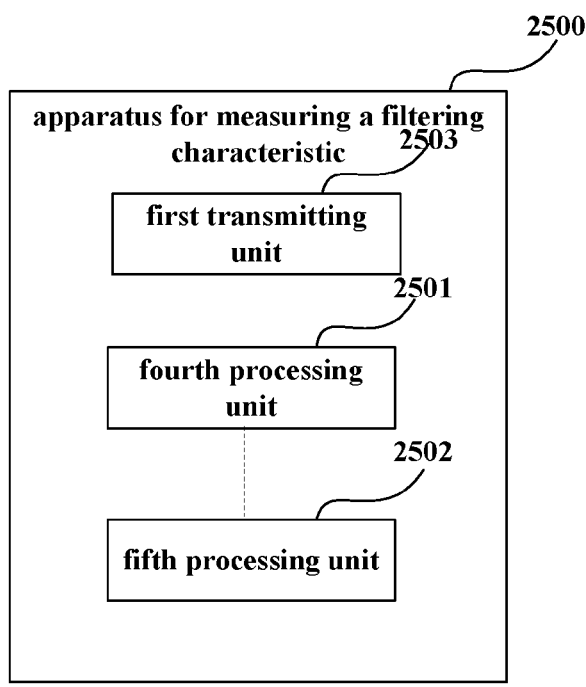
FIG. 25 is a schematic diagram of an apparatus for measuring a filtering characteristic of Embodiment 9.

FIG. 25 is a schematic diagram of an implementation of the apparatus of Embodiment 9. As shown in FIG. 25, the apparatus 2500 includes a fourth processing unit 2501 and a fifth processing unit 2502; wherein, the fourth processing unit 1901 and the fifth processing unit 1902 in Embodiment 6 may be referred to for particular implementations, which shall not be described herein any further.

In this embodiment, the apparatus 2500 may further include a first transmitting unit 2503 configured to transmit the first measurement signal and the second measurement signal. For example, in the first time of measurement, the first measurement signal is only transmitted and passes through the transmitting end filtering module of the transmitter or the transceiver and the receiving end filtering module of the transceiver or the receiver, so as to obtain the fourth receiving signal. Then, in the second time of measurement, the second measurement signal is only transmitted and passes through the receiving end filtering module of the transceiver or the receiver, so as to obtain the third receiving signal. For example, the second measurement signal may be transmitted first in the first time of measurement, and the first measurement signal is transmitted in the second time of measurement; however, this embodiment is not limited thereto.

The fourth processing unit 2501 and the fifth processing unit 2502 may obtain the third receiving signal and the fourth receiving signal, and determine the final filtering characteristic of the receiving end and the joint response; wherein, Embodiment 3 may be referred to for a particular method, which shall not be described herein any further.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

Embodiment 10

Embodiment 10 of the present disclosure provides an apparatus for measuring a filtering characteristic, which differs from the apparatus Embodiment 9 in that in this embodiment, a transmitting end filtering module of an existing transmitter or transceiver and a receiving end filtering module of an existing receiver or transceiver are not used.

Figure 26:
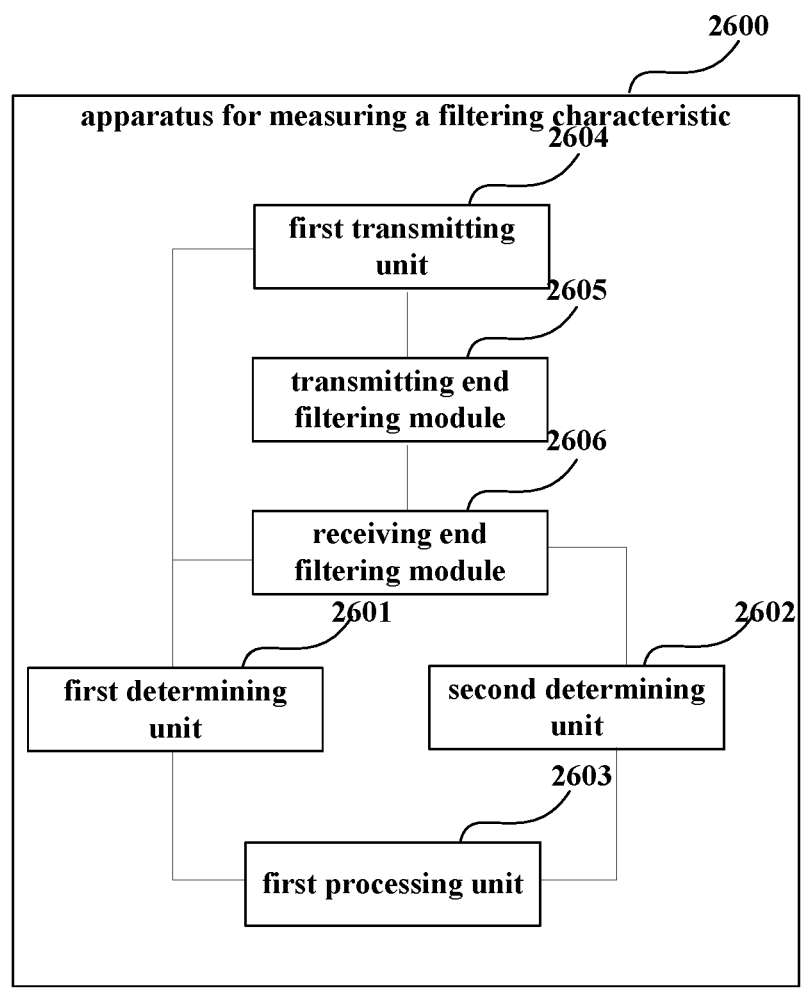
FIG. 26 is a schematic diagram of an apparatus for measuring a filtering characteristic of Embodiment 10.

FIG. 26 is a schematic diagram of an implementation of the apparatus of Embodiment 10. As shown in FIG. 26, the apparatus 2600 includes a first determining unit 2601, a second determining unit 2602, a first processing unit 2603 and a first transmitting unit 2604; wherein, the first determining unit 2401, the second determining unit 2402, the first processing unit 2403 and the first transmitting unit 2404 in Embodiment 9 may be referred to for particular implementations, which shall not be described herein any further.

In this embodiment, the apparatus 2600 may further include a transmitting end filtering module 2605, which is equivalent to a filtering module of a transmitter or a transceiver of which a transmitting end filtering characteristic is to be measured, and a receiving end filtering module 2606, which is equivalent to a filtering module of a receiver or a transceiver of which a receiving end filtering characteristic is to be measured.

In an implementation, the first transmitting unit 2604 transmits the first measurement signal to the transmitting end filtering module 2605, and at the same time, transmits the second measurement signal, which is overlapped with the first measurement signal passing through the transmitting end filtering module 2605 and passes through the receiving end filtering module 2606, so as to obtain a first receiving signal, then transmits the third measurement signal to the transmitting end filtering module 2605, and at the same time, transmits the second measurement signal, which is overlapped with the third measurement signal passing through the transmitting end filtering module and passes through the receiving end filtering module 2606, so as to obtain a second receiving signal.

In an implementation, the first transmitting unit 2604 transmits the first measurement signal to the transmitting end filtering module 2605, and at the same time, transmits the second measurement signal, which is overlapped with the first measurement signal passing through the transmitting end filtering module 2605 and passes through the receiving end filtering module 2606, so as to obtain the first receiving signal, then transmits the first measurement signal to the transmitting end filtering module 2605, and at the same time, transmits the fourth measurement signal, which is overlapped with the first measurement signal passing through the transmitting end filtering module and passes through the receiving end filtering module 2606, so as to obtain the second receiving signal.

The first determining unit 2601 and the second determining unit 2602 may obtain the first receiving signal and the second receiving signal, and the first processing unit 2603 determines the final filtering characteristic of the receiving end and the joint response; wherein, embodiments 1-2 may be referred to for particular methods, which shall not be described herein any further.

In this embodiment, as it is not need to make the first measurement signal and the third measurement signal transmitted by the first transmitting unit 2604 pass through a per-equalizer of the existing transmitter or transceiver, the apparatus needs not to include the setting unit in embodiments 4-5.

In this embodiment, a third determining unit, a fourth determining unit, a second processing unit (which is optional and not shown) and a sixth processing unit (not shown) may further be included; wherein, embodiments 4-5 may be referred to for particular implementations, which shall not be described herein any further.

Figure 27:
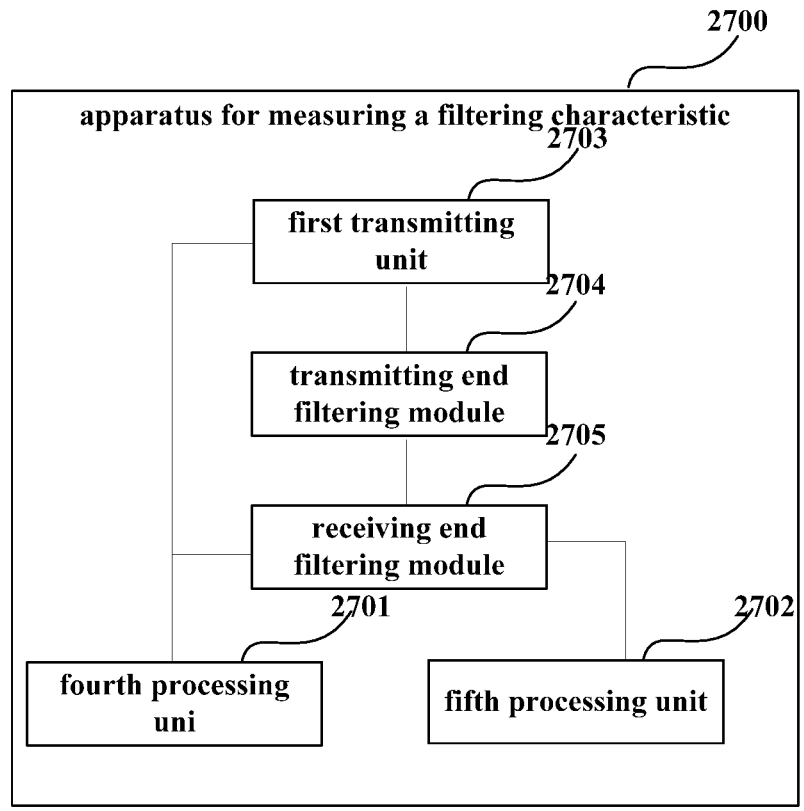
FIG. 27 is a schematic diagram of an apparatus for measuring a filtering characteristic of Embodiment 10.

FIG. 27 is a schematic diagram of an implementation of the apparatus of Embodiment 10. As shown in FIG. 27, the apparatus 2700 includes a fourth processing unit 2701, a fifth processing unit 2702 and a first transmitting unit 2703; wherein, the fourth processing unit 2501, the fifth processing unit 2502 and the first transmitting unit 2503 in Embodiment 9 may be referred to for particular implementations, which shall not be described herein any further.

In this embodiment, the apparatus 2700 may further include a transmitting end filtering module 2704, which is equivalent to a filtering module of a transmitter or a transceiver of which a transmitting end filtering characteristic is to be measured, and a receiving end filtering module 2705, which is equivalent to a filtering module of a receiver or a transceiver of which a receiving end filtering characteristic is to be measured.

In this embodiment, in the first time of measurement, the first transmitting unit 2703 only transmits the first measurement signal, which passes through the transmitting end filtering module 2704 and the receiving end filtering module 2705, so as to obtain the fourth receiving signal. Then, in the second time of measurement, the first transmitting unit 2503 only transmits the second measurement signal, which passes through the receiving end filtering module 2705, so as to obtain the third receiving signal. For example, the second measurement signal may be transmitted first in the first time of measurement, and the first measurement signal is transmitted in the second time of measurement; however, this embodiment is not limited thereto.

The fourth processing unit 2701 and the fifth processing unit 2702 may obtain the third receiving signal and the fourth receiving signal, and determine the final filtering characteristic of the receiving end and the joint response, particular method being as those described in Embodiment 3, which shall not be described herein any further.

In this embodiment, after the filtering characteristic of the transmitting end is determined, the apparatus 2600 or 2700 may transmit the filtering characteristic to the communication equipment, such as a pre-equalizer of a transceiver or a transmitter, so that the pre-equalizer determines a pre-equalizer coefficient according to the filtering characteristic of the transmitting end, for use in pre-equalization processing.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

Embodiment 11

Figure 28:
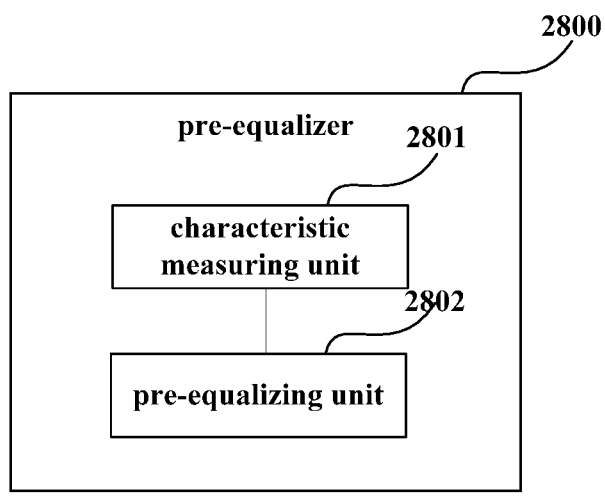
FIG. 28 is a schematic diagram of a pre-equalizer of Embodiment 11.

Embodiment 11 of the present disclosure provides a pre-equalizer. FIG. 28 is a schematic diagram of the pre-equalizer of this embodiment. The pre-equalizer 2800 includes:

a characteristic measuring unit 2801 including an apparatus for measuring a filtering characteristic and configured to determine a filtering characteristic of a transmitting end; and a pre-equalizing unit 2802 configured to determine a coefficient of the pre-equalizer according to the filtering characteristic of the transmitting end, and perform pre-equalization on a transmission signal by using the coefficient of the pre-equalizer.

In this embodiment, any one of the apparatuses for measuring a filtering characteristic in embodiments 4-6 or 9 or 10 may be referred to for a particular implementation of the characteristic measuring unit 2801; and furthermore, the pre-equalizing unit 2802 may determine the coefficient of the pre-equalizer by using a zero-forcing method, and a minimum mean square error method, etc., and perform the pre-equalization on the transmission signal by using the coefficient and using a constant modulus algorithm, and this embodiment is not limited thereto.

Embodiment 12

Embodiment 12 provides a communication equipment, which may be a transceiver or a transmitter, and include the pre-equalizer in Embodiment 11; wherein, Embodiment 11 may be referred to for a particular implementation, which shall not be described herein any further.

It can be seen from this embodiment that measurement is performed twice on different measurement signals of different spectral ranges passing through different filtering modules, and filtering characteristics of the receiving end and the transmitting end and a joint response may be determined by using the transmitter and the receiver themselves, with no need of use of extra instrument, thereby avoiding the problems of high cost and uneasy large-scale use brought about by measurement of filtering characteristic by using instruments.

An embodiment of the present disclosure further provides a computer-readable program, wherein when the program is executed in an apparatus for measuring a filtering characteristic, the program enables a computer to carry out the method for measuring a filtering characteristic as described in embodiments 1-3 in the apparatus for measuring a filtering characteristic.

An embodiment of the present disclosure provides a non-transitory computer readable storage medium in which a computer-readable program is stored, wherein the computer-readable program enables a computer to carry out the method for measuring a filtering characteristic as described in embodiments 1-3 in an apparatus for measuring a filtering characteristic.

The preferred embodiments of the present disclosure are described above with reference to the drawings. The many features and advantages of the embodiments are apparent from the detailed specification and, thus, it is intended by the appended claims to cover all such features and advantages of the embodiments that fall within the scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

For implementations of the present disclosure containing the above embodiments, following supplements are further disclosed.

Supplement 1. An apparatus for measuring a filtering characteristic, including:
a first determining unit configured to determine a first part of a filtering characteristic of a receiving end, or determine a first part of a joint response of a filtering characteristic of a transmitting end and a filtering characteristic of the receiving end, in a spectrum of a first receiving signal obtained after a first measurement signal and a second measurement signal pass through respective filtering modules, according to a nonoverlapped spectral part of the first measurement signal and the second measurement signal;
a second determining unit configured to determine a second part of the filtering characteristic of the receiving end in a spectrum of a second receiving signal obtained after a third measurement signal and the second measurement signal pass through respective filtering modules, according to a nonoverlapped spectral part of the third measurement signal and the second measurement signal, or determine a second part of the joint response of the filtering characteristic of the transmitting end and the filtering characteristic of the receiving end, in a spectrum of a second receiving signal obtained after a fourth measurement signal and the first measurement signal pass through respective filtering modules, according to a nonoverlapped spectral part of the fourth measurement signal and the first measurement signal; and
a first processing unit configured to determine the filtering characteristic of the receiving end according to the first part of the filtering characteristic and the second part of the filtering characteristic, or determine the joint response of the filtering characteristic of the receiving end and the filtering characteristic of the transmitting end according to the first part of the joint response and the second part of the joint response;
wherein, the filtering modules through which the first measurement signal and the third measurement signal pass include a transmitting end filtering module and a receiving end filtering module, the filtering module through which the second measurement signal and the fourth measurement signal pass include the transmitting end filtering module, spectral ranges of the first measurement signal and the second measurement signal are different, and frequencies of the third measurement signal and the first measurement signal are complementary, or frequencies of the fourth measurement signal and the second measurement signal are complementary;
and the frequency complementarity denotes that spectral ranges of two measurement signals cover all measurement range of the filtering characteristic, and the two measurement signals have an overlapped frequency point; and the first measurement signal, the second measurement signal, the third measurement signal and the fourth measurement signal are continuous signals.

Supplement 2. The apparatus according to supplement 1, wherein the first determining unit includes:
a first measuring unit configured to calculate a power spectral density of the first receiving signal;
a first extracting unit configured to extract a first power spectral density of the nonoverlapped spectral part of the first measurement signal and the second measurement signal from a spectrum of the power spectral density of the first receiving signal; and
a first obtaining unit configured to obtain the first part of the filtering characteristic of the receiving end according to the first power spectral density;
and the second determining unit includes:
a second measuring unit configured to calculate a power spectral density of the second receiving signal;
a second extracting unit configured to extract a second power spectral density of the nonoverlapped spectral part of the third measurement signal and the second measurement signal from a spectrum of the power spectral density of the second receiving signal; and
a second obtaining unit configured to obtain the second part of the filtering characteristic of the receiving end according to the second power spectral density.

Supplement 3. The apparatus according to supplement 1, wherein the first processing unit includes:
a first judging unit configured to judge whether responses of the first part of the filtering characteristic and the second part of the filtering characteristic are identical at the overlapped frequency point; and a first combining unit configured to combine the first part of the filtering characteristic and the second part of the filtering characteristic when a result of judgment of the first judging unit is yes, so as to obtain a consecutive filtering characteristic;

and when the result of judgment of the first judging unit is no, the first processing unit further includes:

a first adjusting unit configured to adjust the responses of the first part of the filtering characteristic and the second part of the filtering characteristic at the overlapped frequency point to be identical; and the first combining unit is further configured to combine the adjusted first part of the filtering characteristic and second part of the filtering characteristic, so as to obtain the consecutive filtering characteristic.

Supplement 4. The apparatus according to supplement 2, wherein the first determining unit further includes:

a first removing unit configured to remove the power spectral density of the second measurement signal from the first power spectral density extracted by the first extracting unit when the second measurement signal has no flat power spectral density; and the first obtaining unit determines the first part of the filtering characteristic according to a result of processing of the first removing unit;

and the second determining unit 1302 further includes:

a second removing unit configured to remove the power spectral density of the second measurement signal from the second power spectral density extracted by the second extracting unit when the second measurement signal has no flat power spectral density; and the second obtaining unit determines the second part of the filtering characteristic according to a result of processing of the second removing unit.

Supplement 5. The apparatus according to supplement 2, wherein the apparatus further includes:

a third determining unit configured to determine the first part of the joint response according to an overlapped spectral part of the first measurement signal and the second measurement signal in the spectrum of the power spectral density of the first receiving signal;

a fourth determining unit configured to determine the second part of the joint response according to an overlapped spectral part of the third measurement signal and the second measurement signal in the spectrum of the power spectral density of the second receiving signal; and a second processing unit configured to determine the joint response according to the first part of the joint response and the second part of the joint response.

Supplement 6. The apparatus according to supplement 5, wherein the third determining unit includes:

a third extracting unit configured to extract a third power spectral density of the overlapped spectral part of the first measurement signal and the second measurement signal from the spectrum of the power spectral density of the first receiving signal; and a third obtaining unit configured to obtain the first part of the joint response according to the third power spectral density; and the fourth determining unit includes:

a fourth extracting unit configured to extract a fourth power spectral density of the overlapped spectral part of the third measurement signal and the second measurement signal from the spectrum of the power spectral density of the second receiving signal; and a fourth obtaining unit configured to obtain the second part of the joint response according to the fourth power spectral density.

Supplement 7. The apparatus according to supplement 5, wherein the second processing unit includes:

a second judging unit configured to judge whether responses of the first part of the joint response and the second part of the joint response are identical at the overlapped frequency point; and a second combining unit configured to combine the first part of the joint response and the second part of the joint response when a result of judgment of the second judging unit is yes, so as to obtain a consecutive joint response;

and when the result of judgment of the second judging unit is no, the second processing unit further includes:

a second adjusting unit configured to adjust the responses of the first part of the joint response and the second part of the joint response at the overlapped frequency point to be identical; and the second combining unit is further configured to combine the adjusted first part of the joint response and the second part of the joint response, so as to obtain the consecutive joint response.

Supplement 8. The apparatus according to supplement 6, wherein the third determining unit further includes:

a third removing unit configured to remove the power spectral density of the first measurement signal from the third power spectral density extracted by the third extracting unit when the first measurement signal and the third measurement signal have no flat power spectral density; and the third obtaining unit determines the first part of the joint response according to a result of processing of the third removing unit;

and the fourth determining unit further includes:

a fourth removing unit configured to remove the power spectral density of the third measurement signal from the fourth power spectral density extracted by the fourth extracting unit when the first measurement signal and the third measurement signal have no flat power spectral density; and the fourth obtaining unit determines the second part of the joint response according to a result of processing of the fourth removing unit.

Supplement 9. The apparatus according to supplement 1, wherein the first determining unit includes:

a first measuring unit configured to calculate a power spectral density of the first receiving signal;

a fifth extracting unit configured to extract a fifth power spectral density of the nonoverlapped spectral part of the first measurement signal and the second measurement signal from a spectrum of the power spectral density of the first receiving signal; and a fifth obtaining unit configured to obtain the first part of the joint response according to the fifth power spectral density; and the second determining unit includes:

a second measuring unit configured to calculate a power spectral density of the second receiving signal;

a sixth extracting unit configured to extract a sixth power spectral density of the nonoverlapped spectral part of the first measurement signal and the fourth measurement signal from a spectrum of the power spectral density of the second receiving signal; and a sixth obtaining unit configured to obtain the second part of the joint response according to the sixth power spectral density.

Supplement 10. The apparatus according to supplement 1, wherein the first processing unit includes:

a third judging unit configured to judge whether responses of the first part of the joint response and the second part of the joint response are identical at the overlapped frequency point; and a third combining unit configured to combine the first part of the joint response and the second part of the joint response when a result of judgment of the third judging unit is yes, so as to obtain the consecutive joint response;
and when the result of judgment of the third judging unit is no, the first processing unit further includes:
a third adjusting unit configured to adjust the responses of the first part of the joint response and the second part of the joint response at the overlapped frequency point to be identical; and the third combining unit is further configured to combine the adjusted first part of the joint response and second part of the joint response, so as to obtain the consecutive joint response.

Supplement 11. The apparatus according to supplement 9, wherein the first determining unit further includes:
a fifth removing unit configured to remove the power spectral density of the first measurement signal from the fifth power spectral density extracted by the fifth extracting unit when the first measurement signal has no flat power spectral density; and the fifth obtaining unit determines the first part of the joint response according to a result of processing of the fifth removing unit;
and the second determining unit further includes:
a sixth removing unit configured to remove the power spectral density of the first measurement signal from the sixth power spectral density extracted by the sixth extracting unit when the first measurement signal has no flat power spectral density; and the sixth obtaining unit determines the second part of the joint response according to a result of processing of the sixth removing unit.

Supplement 12. The apparatus according to supplement 9, wherein the apparatus further includes:
a fifth determining unit configured to determine the first part of the filtering characteristic of the receiving end according to an overlapped spectral part of the first measurement signal and the second measurement signal in the spectrum of the power spectral density of the first receiving signal;
a sixth determining unit configured to determine the second part of the filtering characteristic of the receiving end according to an overlapped spectral part of the first measurement signal and the fourth measurement signal in the spectrum of the power spectral density of the second receiving signal; and
a third processing unit configured to determine the filtering characteristic of the receiving end according to the first part of the filtering characteristic and the second part of the filtering characteristic.

Supplement 13. The apparatus according to supplement 12, wherein the fifth determining unit includes:
a seventh extracting unit configured to extract a seventh power spectral density of the overlapped spectral part of the first measurement signal and the second measurement signal from the spectrum of the power spectral density of the first receiving signal; and
a seventh obtaining unit configured to obtain the first part of the filtering characteristic according to the seventh power spectral density;
and the sixth determining unit includes:
an eighth extracting unit configured to extract an eighth power spectral density of the overlapped spectral part of the fourth measurement signal and the first measurement signal from the spectrum of the power spectral density of the second receiving signal; and
an eighth obtaining unit configured to obtain the second part of the filtering characteristic according to the eighth power spectral density.

Supplement 14. The apparatus according to supplement 12, wherein the third processing unit includes:

a fourth judging unit configured to judge whether responses of the first part of the filtering characteristic and the second part of the filtering characteristic are identical at the overlapped frequency point; and
a fourth combining unit configured to combine the first part of the filtering characteristic and the second part of the filtering characteristic when a result of judgment of the fourth judging unit 1801 is yes, so as to obtain the consecutive filtering characteristic of the receiving end;
and when the result of judgment of the fourth judging unit is no, the third processing unit further includes:
a fourth adjusting unit configured to adjust the responses of the first part of the filtering characteristic and the second part of the filtering characteristic at the overlapped frequency point to be identical; and the fourth combining unit is further configured to combine the adjusted first part of the filtering characteristic and second part of the filtering characteristic, so as to obtain the consecutive filtering characteristic of the receiving end.

Supplement 15. The apparatus according to supplement 13, wherein the fifth determining unit further includes:
a seventh removing unit configured to remove the power spectral density of the second measurement signal from the seventh power spectral density extracted by the seventh extracting unit when the second measurement signal and the fourth measurement signal have no flat power spectral density; and the seventh obtaining unit determines the first part of the filtering characteristic according to a result of processing of the seventh removing unit;
and the sixth determining unit further includes:
an eighth removing unit configured to remove the power spectral density of the fourth measurement signal from the eighth power spectral density extracted by the eighth extracting unit when the second measurement signal and the fourth measurement signal have no flat power spectral density; and the eighth obtaining unit determines the second part of the filtering characteristic according to a result of processing of the eighth removing unit.

Supplement 16. An apparatus for measuring a filtering characteristic, including:
a fourth processing unit configured to determine a filtering characteristic of a receiving end according to a power spectral density of a third receiving signal obtained after a second measurement signal passes through a receiving end filtering module; wherein, a spectrum of the second measurement signal covers a whole measurement range of the filtering characteristic.

Supplement 17. The apparatus according to supplement 16, wherein the apparatus further includes:
a fifth processing unit configured to determine a joint response of the filtering characteristic of the receiving end and a filtering characteristic of a transmitting end according to a power spectral density of a fourth receiving signal obtained after a first measurement signal passes through a transmitting end filtering module and the receiving end filtering module; wherein, a spectrum of the first measurement signal covers the whole measurement range of the filtering characteristic.

Supplement 18. The apparatus according to supplement 5, wherein the apparatus further includes:
a sixth processing unit configured to determine the filtering characteristic of the transmitting end according to the joint response and the filtering characteristic of the receiving end.

Supplement 19. A pre-equalizer, including:
a characteristic measuring unit configured to determine a filtering characteristic of a transmitting end and including the apparatus for measuring a filtering characteristic as supplemented in supplement 18; and a pre-equalizing unit configured to determine a coefficient of the pre-equalizer according to the filtering characteristic of the transmitting end, and perform pre-equalization on a transmission signal by using the coefficient of the pre-equalizer.

Supplement 20. A communication equipment, including the apparatus for measuring a filtering characteristic as described in supplement 1.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for measuring a filtering characteristic, including:

processor circuitry configured to:

one of determine a first part of a filtering characteristic of a receiving end and determine a first part of a joint response of the filtering characteristic of a transmitting end and the filtering characteristic of the receiving end, in a spectrum of a first receiving signal obtained after a first measurement signal and a second measurement signal pass through respective filtering modules, according to a nonoverlapped spectral part of the first measurement signal and the second measurement signal;

one of determine a second part of the filtering characteristic of the receiving end in a spectrum of a second receiving signal obtained after a third measurement signal and the second measurement signal pass through respective filtering modules, according to a nonoverlapped spectral part of the third measurement signal and the second measurement signal and determine a second part of the joint response of the filtering characteristic of the transmitting end and the filtering characteristic of the receiving end, in the spectrum of the second receiving signal obtained after a fourth measurement signal and the first measurement signal pass through respective filtering modules, according to a nonoverlapped spectral part of the fourth measurement signal and the first measurement signal; and one of determine the filtering characteristic of the receiving end according to the first part of the filtering characteristic and the second part of the filtering characteristic and determine the joint response of the filtering characteristic of the transmitting end and the filtering characteristic of the receiving end according to the first part of the joint response and the second part of the joint response;

wherein, the filtering modules through which the first measurement signal and the third measurement signal pass include a transmitting end filtering module and a receiving end filtering module, a filtering module through which the second measurement signal and the fourth measurement signal pass include the transmitting end filtering module, spectral ranges of the first measurement signal and the second measurement signal are different, and one of frequencies of the third measurement signal and the first measurement signal are complementary and frequencies of the fourth measurement signal and the second measurement signal are complementary;

and frequency complementarity denotes that spectral ranges of two measurement signals cover all a measurement range of the filtering characteristic, and the two measurement signals have an overlapped frequency point; and the first measurement signal, the second measurement signal, the third measurement signal and the fourth measurement signal are continuous signals.

2. The apparatus according to claim 1, wherein the processor circuitry configured to:

calculate a first receiving signal power spectral density of the first receiving signal;

extract a first power spectral density of the nonoverlapped spectral part of the first measurement signal and the second measurement signal from the spectrum of the first receiving signal power spectral density of the first receiving signal; and obtain the first part of the filtering characteristic of the receiving end according to the first power spectral density; and calculate a second receiving signal power spectral density of the second receiving signal;

extract a second power spectral density of the nonoverlapped spectral part of the third measurement signal and the second measurement signal from the spectrum of the power spectral density of the second receiving signal; and obtain the second part of the filtering characteristic of the receiving end according to the second receiving signal second power spectral density.

3. The apparatus according to claim 1, wherein the processor circuitry configured to:

judge whether responses of the first part of the filtering characteristic and the second part of the filtering characteristic are identical at the overlapped frequency point; and combine the first part of the filtering characteristic and the second part of the filtering characteristic when a result of judgment is responses of the first part of the filtering characteristic and the second part of the filtering characteristic are identical at the overlapped frequency point to obtain a consecutive filtering characteristic;

and when the result of judgment is responses of the first part of the filtering characteristic and the second part of the filtering characteristic are not identical at the overlapped frequency points, the processor circuitry further configured to:

adjust the responses of the first part of the filtering characteristic and the second part of the filtering characteristic at the overlapped frequency point to be identical; and combine an adjusted first part of the filtering characteristic and second part of the filtering characteristic to obtain the consecutive filtering characteristic.

4. The apparatus according to claim 2, wherein the processor circuitry further configured to:

remove a second measurement signal power spectral density of the second measurement signal from the first power spectral density when the second measurement signal has a non flat power spectral density; and determine the first part of the filtering characteristic according to a result of processing; and remove the second measurement signal power spectral density of the second measurement signal from the second power spectral density extracted when the second measurement signal has the non flat power spectral density; and determine the second part of the filtering characteristic according to the result of processing.

5. The apparatus according to claim 2, wherein the processor circuitry further configured to:
determine the first part of the joint response according to an overlapped spectral part of the first measurement signal and the second measurement signal in the spectrum of the power spectral density of the first receiving signal;
determine the second part of the joint response according to the overlapped spectral part of the third measurement signal and the second measurement signal in the spectrum of the power spectral density of the second receiving signal; and
determine the joint response according to the first part of the joint response and the second part of the joint response.

6. The apparatus according to claim 5, wherein the processor circuitry configured to:
extract a third power spectral density of the overlapped spectral part of the first measurement signal and the second measurement signal from the spectrum of the power spectral density of the first receiving signal; and
obtain the first part of the joint response according to the third power spectral density; and
extract a fourth power spectral density of the overlapped spectral part of the third measurement signal and the second measurement signal from the spectrum of the power spectral density of the second receiving signal; and
obtain the second part of the joint response according to the fourth power spectral density.

7. The apparatus according to claim 5, wherein the processor circuitry configured to:
judge whether responses of the first part of the joint response and the second part of the joint response are identical at the overlapped frequency point; and
combine the first part of the joint response and the second part of the joint response when a result of judgment is responses of the first part of the joint response and the second part of the joint response are identical at the overlapped frequency point to obtain the consecutive joint response; and
when the result of judgment is responses of the first part of the joint response and the second part of the joint response are not identical at the overlapped frequency point,
adjust the responses of the first part of the joint response and the second part of the joint response at the overlapped frequency point to be identical; and combine the adjusted first part of the joint response and the second part of the joint response to obtain the consecutive joint response.

8. The apparatus according to claim 6, wherein the processor circuitry configured to:
remove the power spectral density of the first measurement signal from the third power spectral density when the first measurement signal and the third measurement signal have the non flat power spectral density; and determine the first part of the joint response according to a result of processing; and
remove the power spectral density of the third measurement signal from the fourth power spectral density when the first measurement signal and the third measurement signal have the non flat power spectral density; and determine the second part of the joint response according to a result of processing.

9. The apparatus according to claim 5, wherein the processor circuitry further configured to:
determine the filtering characteristic of the transmitting end according to the joint response and the filtering characteristic of the receiving end.

10. A pre-equalizer, including:
processor circuitry configured to:
determine a filtering characteristic of a transmitting end and including the apparatus for measuring a filtering characteristic as claimed in claim 9; and
determine a coefficient of the pre-equalizer according to the filtering characteristic of the transmitting end, and perform pre-equalization on a transmission signal by using the coefficient of the pre-equalizer.

11. The apparatus according to claim 1, wherein
the processor circuitry configured to:
calculate the power spectral density of the first receiving signal;
extract a fifth power spectral density of the nonoverlapped spectral part of the first measurement signal and the second measurement signal from the spectrum of the power spectral density of the first receiving signal; and
obtain the first part of the joint response according to the fifth power spectral density; and
calculate the power spectral density of the second receiving signal;
extract a sixth power spectral density of the nonoverlapped spectral part of the first measurement signal and the fourth measurement signal from the spectrum of the power spectral density of the second receiving signal; and
obtain the second part of the joint response according to the sixth power spectral density.

12. The apparatus according to claim 11, wherein
the processor circuitry configured to:
remove the power spectral density of the first measurement signal from the fifth power spectral density when the first measurement signal has the non flat power spectral density; and determine the first part of the joint response according to the fifth power spectral density after removing the power spectral density of the first measurement signal; and
remove the power spectral density of the first measurement signal from the sixth power spectral density when the first measurement signal has the non flat power spectral density; and determine the second part of the joint response according to the sixth power spectral density after removing the power spectral density of the first measurement signal.

13. The apparatus according to claim 11, wherein the processor circuitry configured to:
determine the first part of the filtering characteristic of the receiving end according to the overlapped spectral part of the first measurement signal and the second measurement signal in the spectrum of the power spectral density of the first receiving signal;
determine the second part of the filtering characteristic of the receiving end according to the overlapped spectral part of the first measurement signal and the fourth measurement signal in the spectrum of the power spectral density of the second receiving signal; and
determine the filtering characteristic of the receiving end according to the first part of the filtering characteristic and the second part of the filtering characteristic.

14. The apparatus according to claim 13, wherein the processor circuitry configured to:

extract a seventh power spectral density of the overlapped spectral part of the first measurement signal and the second measurement signal from the spectrum of the power spectral density of the first receiving signal; and obtain the first part of the filtering characteristic according to the seventh power spectral density; and extract an eighth power spectral density of the overlapped spectral part of the fourth measurement signal and the first measurement signal from the spectrum of the power spectral density of the second receiving signal; and obtain the second part of the filtering characteristic according to the eighth power spectral density.

15. The apparatus according to claim 13, wherein the processor circuitry configured to:

judge whether responses of the first part of the filtering characteristic and the second part of the filtering characteristic are identical at the overlapped frequency point; and combine the first part of the filtering characteristic and the second part of the filtering characteristic when a result of judgment is responses of the first part of the filtering characteristic and the second part of the filtering characteristic are identical at the overlapped frequency point, so as to obtain the consecutive filtering characteristic of the receiving end; and when the result of judgment is responses of the first part of the filtering characteristic and the second part of the filtering characteristic are not identical at the overlapped frequency point, adjust the responses of the first part of the filtering characteristic and the second part of the filtering characteristic at the overlapped frequency point to be identical; and combine the adjusted first part of the filtering characteristic and second part of the filtering characteristic to obtain the consecutive filtering characteristic of the receiving end.

16. The apparatus according to claim 14, wherein the processor circuitry configured to:

remove the power spectral density of the second measurement signal from the seventh power spectral density when the second measurement signal and the fourth measurement signal have the non flat power spectral density; and determine the first part of the filtering characteristic according to the seventh power spectral density after removing the power spectral density of the second measurement signal; and remove the power spectral density of the fourth measurement signal from the eighth power spectral density when the second measurement signal and the fourth measurement signal have the non flat power spectral density; and determine the second part of the filtering characteristic according to the eighth power spectral density after removing the power spectral density of the fourth measurement signal.

17. The apparatus according to claim 1, wherein the processor circuitry configured to:

judge whether responses of the first part of the joint response and the second part of the joint response are identical at the overlapped frequency point; and combine the first part of the joint response and the second part of the joint response when a result of judgment is responses of the first part of the joint response and the second part of the joint response are identical at the overlapped frequency point to obtain the consecutive joint response;

and when the result of judgment is responses of the first part of the joint response and the second part of the joint response are not identical at the overlapped frequency point, adjust the responses of the first part of the joint response and the second part of the joint response at the overlapped frequency point to be identical; and combine the adjusted first part of the joint response and second part of the joint response to obtain the consecutive joint response.

18. A communication equipment, including the apparatus for measuring a filtering characteristic as described in claim 1.

* * * * *